United States Patent [19]
Bernady et al.

[11] 3,853,951
[45] Dec. 10, 1974

[54] PREPARATION OF 9-OXO-13-TRANS-PROSTENOIC ACID ESTERS BY ALANATE ADDITION TO CYCLOPENTENONE

[75] Inventors: Karel Francis Bernady; Middleton Brawner Floyd, Jr., both of Suffern; John Frank Poletto, Nanuet, all of N.Y.; Robert Eugene Schaub, Upper Saddle River; Martin Joseph Weiss, Oradell, both of N.J.

[73] Assignee: American Cyanamid Company, Stamford, Conn.

[22] Filed: Apr. 30, 1973

[21] Appl. No.: 355,844

Related U.S. Application Data

[62] Division of Ser. No. 162,711, July 14, 1971, abandoned.

[52] U.S. Cl. ............... 260/468 D, 260/247.2 B, 260/293.15, 260/295 R, 260/326.3, 260/340.9, 260/410, 260/410.9 R, 260/413, 260/448 A, 260/456 P, 260/468 J, 260/468 K, 260/488 R, 260/514 D, 260/514 K, 260/566 AE, 424/305, 424/317

[51] Int. Cl. ............... C07c 67/74, C07c 61/36
[58] Field of Search ............... 260/468 D, 514 D

[56] References Cited
OTHER PUBLICATIONS

Patai, The Chemistry of Carbonyl Compounds, pp. 671–679, (1966).
Fieser et al., Reagents for Organic Synthesis, Volume 2, 141–142, (1969).

*Primary Examiner*—Robert Gerstl
*Attorney, Agent, or Firm*—Edward A. Conroy, Jr.

[57] ABSTRACT

This disclosure describes a process for the preparation of homologues, analogues, congeners, and derivatives of 9-oxo-13-trans-prostenoic acid which possess antimicrobial activity and prostaglandin-like hypotensive activity.

10 Claims, No Drawings

PREPARATION OF 9-OXO-13-TRANS-PROSTENOIC ACID ESTERS BY ALANATE ADDITION TO CYCLOPENTENONE

CROSS REFERENCE TO RELATED APPLICATION

This application is a division of our copending application Ser. No. 162,711, filed July 14, 1971 and now abandoned.

BRIEF SUMMARY OF THE INVENTION

This invention relates to new organic compounds and, more particularly, is concerned with a class of compounds related to the natural prostaglandins. The novel compounds of the present invention may be represented by the following general formula:

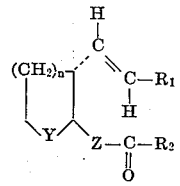

wherein $n$ is the integer 1 or 2; Y is a divalent radical selected from the group consisting of

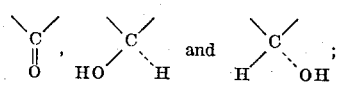

Z is a divalent radical selected from the group consisting of

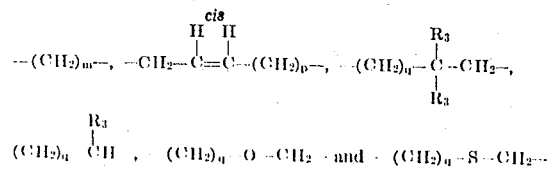

wherein $m$ is an integer from 1 to 8, inclusive, $p$ is an integer from 2 to 4, inclusive, $q$ is an integer from 3 to 6, inclusive, and $R_3$ is a lower alkyl group having up to three carbon atoms; $R_1$ is selected from the group consisting of a. a straight chain alkyl group having from three to 10 carbon atoms,
b. a straight chain alkyl group having from two to six carbon atoms and having one branched methyl group,
c. a straight chain alkenyl group having from three to six carbon atoms,
d. a straight chain ω-haloalkyl group having from three to six carbon atoms,
e. a straight chain ω-mercaptoalkyl group having from three to six carbon atoms,
f. a straight chain ω-carboxyalkyl group having from three to six carbon atoms, and
g. moieties of the formulae:

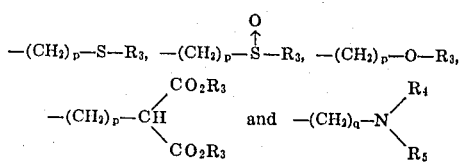

wherein p, q and $R_3$ are as hereinabove defined, $R_4$ is hydrogen or lower alkyl, $R_5$ is hydrogen or lower alkyl, and $R_4$ and $R_5$ taken together with the N(itrogen) is pyrrolidino, piperidino or morpholino; and $R_2$ is selected from the group consisting of hydroxy, alkoxy having from one to four carbon atoms, pyridoxy, 2,2,2-trichloroethoxy and a moiety of the formula:

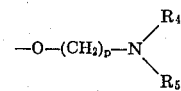

wherein $p$, $R_4$ and $R_5$ are as hereinabove defined. Suitable lower alkyl groups contemplated by the present invention are those having up to four carbon atoms such as, for example, methyl, ethyl, isopropyl, sec-butyl, etc. Halo is exemplified by chloro, bromo or iodo whereas pyridoxy may be α-, β-, or γ-pyridoxy.

DETAILED DESCRIPTION OF THE INVENTION

The prostaglandins are a family of closely related compounds which have been obtained from various animal tissues, and which stimulate smooth muscle, lower arterial blood pressure, antagonize epinephrine-induced mobilization of free fatty acids, and have other pharmacological and autopharmacological effects in mammals. See Bergstrom et al., J. Biol. Chem. 238, 3555 (1963) and Horton, Experientia 21, 113 (1965) and references cited therein. All of the so-called natural prostaglandins are derivatives of prostanoic acid:

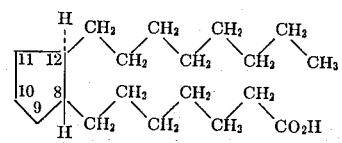

Thy hydrogen atoms attached to C-8 and C-12 are in trans configuration.

The novel compounds of the present invention may be readily prepared from 2-carbethoxycyclopentanone or 2-carbethoxy-cyclohexanone in accordance with the reaction schemes set forth in Flowsheets A through G. In particular, the requisite 2-(ω-carbethoxyalkyl)cycloalk-2-en-1-one intermediates (VIII) may be prepared in accordance with the following reaction scheme:

FLOWSHEET A

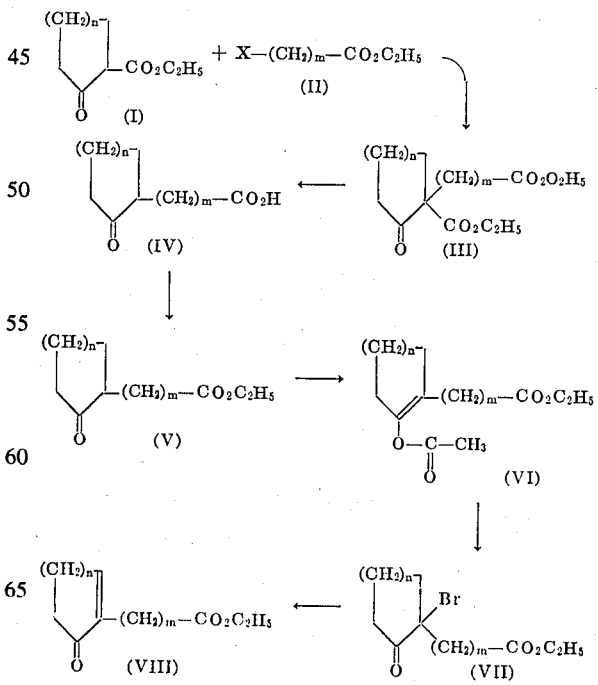

wherein $m$ and $n$ are as hereinabove defined and X is iodo or bromo. In accordance with this reaction scheme, the cycloalk-2-en-1-ones (VIII) are developed by first converting 2-carbethoxycyclopenta-none or 2-carbethoxycyclohexanone (I) to the sodium enolates thereof by means of sodium hydride in dimethoxyethane and then treating the sodium enolate with an ethyl ω-haloalkanoate (II). There is thus obtained the corresponding 2-carbethoxy-2-(ω-carbethoxyalkyl)cycloalkanone (III) which is then hydrolyzed and decarboxylated to afford the 2-(ω-carboxyalkyl) cycloalkanone (IV). This acid is then esterified with ethanol whereby the 2-(ω-carbethoxyalkyl)cycloalkanone (V) is obtained. The reaction conditions for carrying out the above sequence of reactions are well known in the art. The conversion of the cycloalkanone (V) to the enol acetate (VI) is effected by heating with acetic anhydride in the presence of p-toluenesulfonic acid. Preparation of the enol acetate (VI) usually requires heating for a period of from about eight to thirty-six hours. During this period, it is preferable to allow by-product acetic acid to distill out in order to force the reaction to completion. The bromination of the enol acetates (VI) to the 2-bromocycloalkanones (VII) is preferably carried out in a two phase system as follows. A solution of bromine in chloroform is added to a rapidly stirred mixture of a solution of the enol acetate (VI) in chloroform and an aqueous solution of an acid acceptor such as calcium carbonate or soda ash. This addition is carried out at 0°–5°C. over a period of about half an hour, stirring is continued for an additional period of about half an hour to a few hours, and the product (VII) is then isolated by standard procedures. The dehydrobromination of the 2-bromocycloalkanones (VII) is preferably carried out in dimethylformamide with a mixture of lithium bromide and lithium carbonate at the reflux temperature for a period of about 30 minutes to an hour or so. The so formed cycloalk-2-en-1-ones (VIII) are also isolated by standard procedures well known in the art. Substitution of $X-(CH_2)_q-C(R_3-)_2-CH_2-CO_2C_2H_5$ for (II) in Flowsheet A and carrying through the sequence of transformations illustrated therein is productive of the following cycloalk-2-en-1-one (VIIIa):

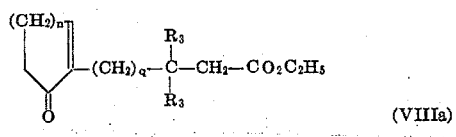

(VIIIa)

wherein X, $n$, $q$ and $R_3$ are as hereinabove defined.

The required cycloalk-2-en-1-one intermediates of general structure (XVI), wherein the side-chain has a lower alkyl group alpha to the carbethoxy function, may be prepared in accordance with the following reaction scheme:

FLOWSHEET B

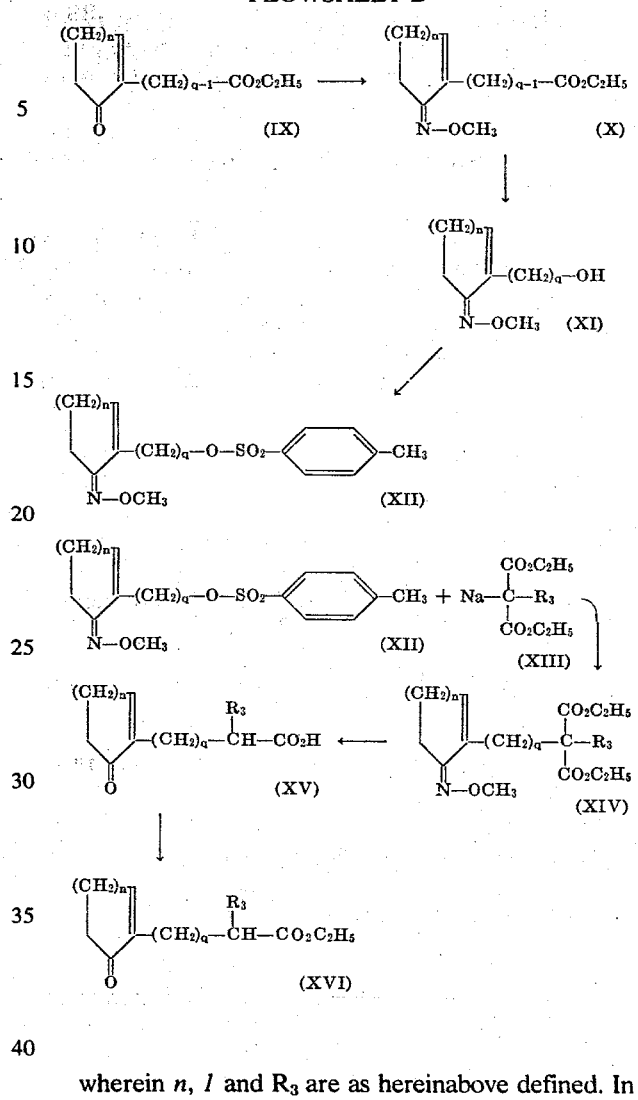

wherein $n$, $l$ and $R_3$ are as hereinabove defined. In accordance with this reaction shceme, the 2-(ω-carbethoxyalkyl)cycloalk-2-en-1-ones (IX) are converted to the corresponding 1-methoximino-2-(ω-carbethoxyalkyl)-2-cycloalkenes (X) by treatment with methoxyamine. With the ring carbonyl function thus blocked it is possible to effect a preferential reduction of the ester group by treatment with diisobutylaluminum hydride. The resulting alcohol (XI) is converted to a tosylate derivative (XII), which undergoes displacement on treatment with the sodium salt of a diethyl lower alkyl malonate (XIII) to provide the disubstituted malonate derivatives (XIV). Hydrolysis and decarboxylation as well as concomittant cleavage of the methoximino blocking group provides the desired 2-(ω-carboxy-α-lower alkyl-alkyl)cycloalk-2-en-1-ones (XV), which are readily converted to the corresponding ester (XVI) by the usual Fisher procedure.

The requisite 2-(ω-carbethoxy-3-oxa-alkyl)cycloalk-2-en-1-ones (XXII) and 2-(ω-carbethoxy-3-thia-alkyl)cycloalk-2-en-1-ones (XXVI) may be prepared in accordance with the reaction schemes of Flowsheet C, wherein $n$ and $q$ are as hereinbefore defined.

FLOWSHEET C

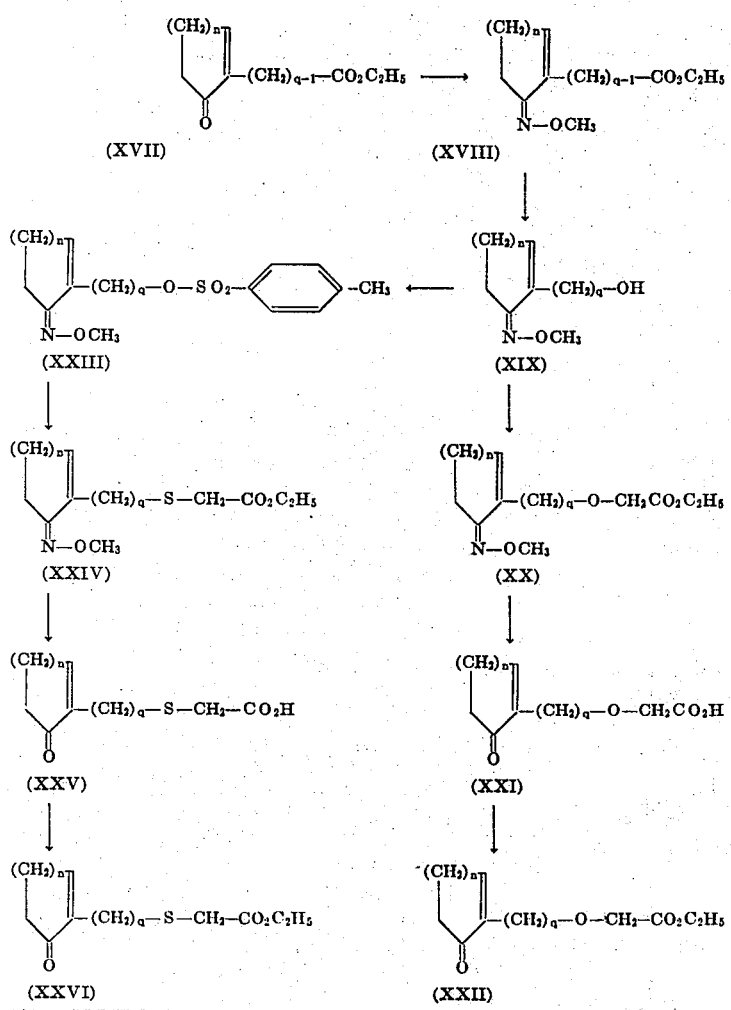

In accordance with the reaction scheme shown in Flowsheet C, for the preparation of the oxa derivative (XXII), an appropriate 2-(ω-carbethoxyalkyl)cycloalk-2-en-1-one (XVII) is converted to the corresponding methoxime (XVIII), the ester function of which is then preferentially reduced with diisobutylaluminum hydride to afford the methoxime alcohol (XIX). The alcohol (XIX) is converted on treatment with n-butyl lithium to the lithio alcoholate, which then is O-alkylated by reaction with ethyl bromoacetate to provide (XX). Hydrolysis with acetone-aqueous hydrochloric acid furnishes the deblocked keto-acid (XXI), which is then re-esterified with ethanol in the presence of p-toluenesulfonic acid to give the required 2-(ω-carbethoxy-3-oxa-alkyl)cycloalk-2-en-1one (XXII). O-Alkylation can also be accomplished by treatment of the lithio alcoholate of (XIX) with sodium or other metal salt of bromoacetic acid, in which case the free carboxylic acid corresponding to ester (XX) is obtained. Hydrolysis as for (XX) provides the keto acid (XXI).

The preparation of the thia derivatives (XXVI), proceeds from the intermediate alcohol (XIX), which after conversion to the tosylate intermediate (XXIII) and reaction with the sodium salt of ethyl mercaptoacetate furnishes intermediate (XXIV). Deblocking of XXIV with acetone-aqueous hydrochloric acid provides the keto-acid (XXV), which on re-esterification with etha- nol gives the requires 2-(ω-carbethoxy-3-thia-alkyl)cycloalk-2-en-1-ones (XXVI).

Certain of the novel compounds of the present invention may be obtained by the conjugate 1,4-addition of an alanate salt to a 2-substituted cycloalk-2-en-1-one, which method is also a part of the present invention. This novel procedure is set forth in the following reaction scheme:

FLOWSHEET D

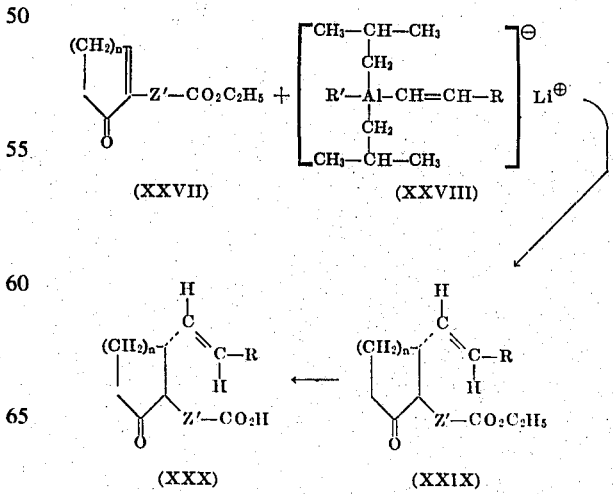

wherein Z' is a divalent radical selected from the group consisting of —(CH$_2$)$_m$—,

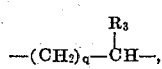

—(CH$_2$)$_q$—C(R$_3$)$_2$—CH$_2$—, —(CH$_2$)$_q$—O—CH$_2$— and —(CH$_2$)$_q$—S—CH$_2$— and $n$, $m$, $q$ and $R_3$ are as hereinbefore defined; R' is a lower alkyl group, preferably methyl or n-butyl; and R is a straight chain alkyl group having from three to 10 carbon atoms, a straight chain alkyl group having from two to six carbon atoms and having one branched methyl group, a straight chain alkenyl group having from four to six carbon atoms, or a straight chain ω-chloroalkyl group having from three to six carbon atoms. The compounds (XXIX) are readily prepared by the conjugate 1,4-addition of an alanate salt (XXVIII) to a 2-substituted cycloalk-2-en-1-one (XXVII). The yields for this operation are usually high and a clean product, uncontaminated with 1,2-addition product, is usually obtained. Furthermore, the transfer of the alkene group is effected with retention of the trans-configuration of the hydrogen atoms attached to the double bond, and no reaction is noted at the carbethoxy function of (XXVII). Another noteworthy aspect of this reaction is that it does not require a catalyst. The alanate salts (XXVIII) are conveniently prepared by the reaction of an appropriate 1-alkyne (R—C≡CH) with diisobutylaluminum hydride, followed by reaction with a lower alkyl lithium derivative, preferably methyl lithium or n-butyl lithium. Suitable 1-alkynes which may be thus employed are, for example, 1-pentyne, 1-hexyne, 1-decyne, 1-hendecyne, 1-dodecyne, 3-methyl-1-butyne, 1-heptyne, 1-octyne, 1-nonyne, 5-methyl-1-hexyne, 7-methyl-1-octyne, 7-methyl-1-nonyne, 3-methyl-1-octyne, 4-methyl-1-octyne, oct-5-en-1-yne, hept-5en-1-yne, hex-4-en-1yne, 5-chloro-1-pentyne, 6-chloro-1-hexyne, 7-chloro-1-heptyne, 8-chloro-1-octyne, etc. The reaction of the 1-alkyne with diisobutylaluminum hydride cleanly provides the trans-double bond and is preferably carried out in an inert solvent such as benzene, toluene, and the like at temperatures in the range of 40°–60°C. for several hours. The solvent is removed in vacuo and the subsequent reaction with methyl or n-butyl lithium is preferably carried out in an ether-type solvent such as diethyl ether, dibutyl ether, tetrahydrofuran, and the like. This reaction is rapid and is preferably carried out at 0°–10°C. with cooling. The conjugate 1,4-addition of the resulting alanate salt (XXVIII) to the cycloalk-2-en-1-one (XXVII) is preferably carried out at ambient temperatures for a period of 12 to 24 hours. This reaction is also best carried out in an ether-type solvent such as diethyl ether, dibutyl ether, tetrahydrofuran, and the like. The intermediate alanate-enolate adduct is then hydrolyzed in situ with dilute hydrochloric acid with cooling, and the products (XXIX) are isolated in the usual manner well known in the art. The conversion of the esters (XXIX) to the acids (XXX) is readily accomplished by mild saponification procedures such as in 0.5N aqueous-methanolic KOH at room temperature for 20–48 hours.

Other compounds of this invention may be prepared as illustrated by the following flowsheets. In Flowsheet E, $n$, $p$, Z, $R_3$, $R_4$ and $R_5$ have the values hereinbefore defined.

FLOWSHEET E

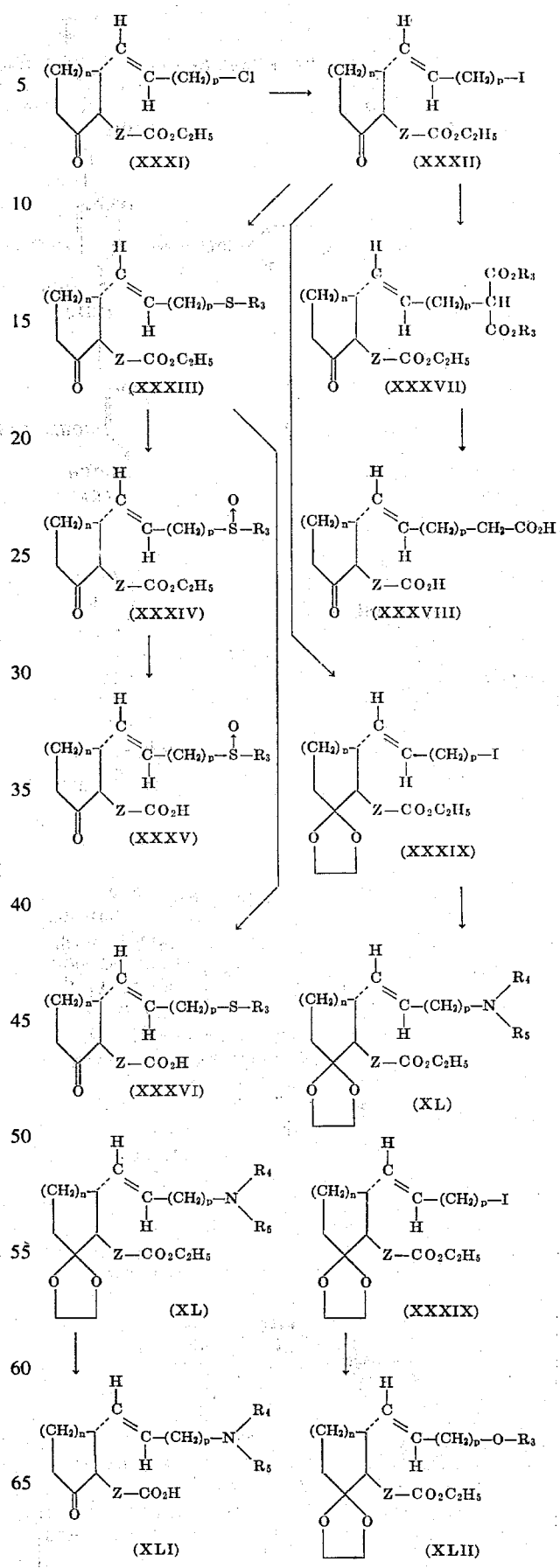

FLOWSHEET F

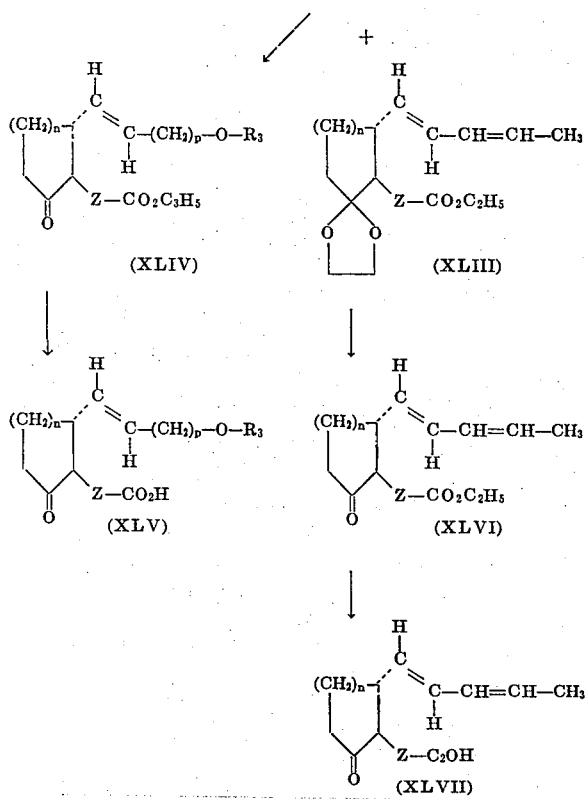
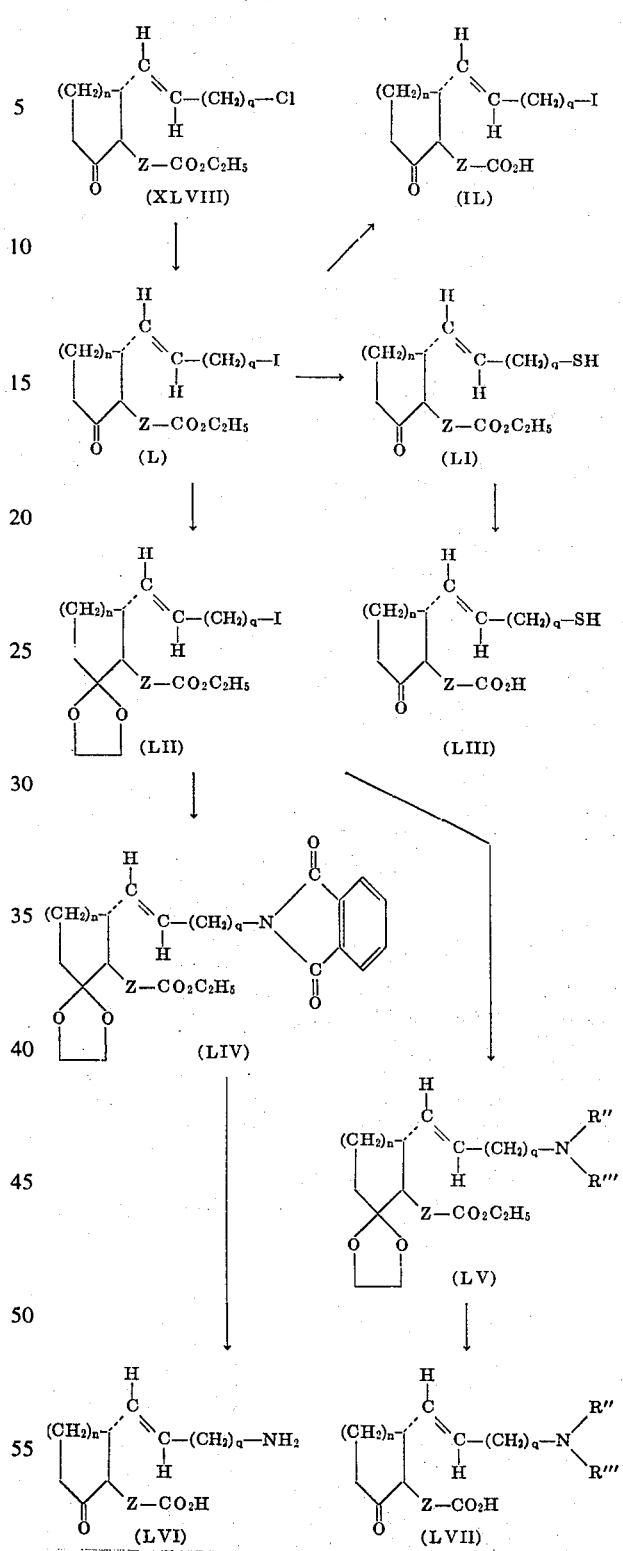

In Flowsheet E, treatment of the chloro derivative (XXXI) with sodium iodide provides the iodo derivative (XXXII), which on treatment with the sodium salt of an alkyl mercaptan furnishes the thia derivative (XXXIII), saponification of which gives (XXXVI). Sulfur-oxidation of (XXXIII) with an equivalent of sodium metaperiodate affords the sulfoxide ester (XXXIV), which on saponification gives the corresponding acid (XXXV).

When the iodo derivative (XXXII) is treated with diethyl sodio malonate the triester (XXXVII) results, which on saponification provides the corresponding triacid, heating of which in refluxing xylene causes decarboxylation of the substituted malonic acid to give the diacid (XXXVIII).

For some displacement reactions it is preferable to protect the ring ketone function in (XXXII). This can be accomplished by conversion to the ethylene ketal derivatives (XXXIX). Treatment of (XXXIX) with pyrrolidine gives the pyrrolidino derivative (XL), acid hydrolysis of the ketal blocking group then gives the keto-aminoacid (XLI). Treatment of iodo ketal (XXXIX) with a metal alkoxide provides a mixture of the oxa derivative (XLII) and the diene (XLIII), separable by chromatography. Ketal hydrolysis with acetone and p-toluenesulfonic acid of these two ketal esters gives the corresponding keto ester (XLIV) and (XLVI), respectively, saponification of which furnishes the keto acids (XLV) and (XLVII), respectively.

Additional transformations are illustrated in Flowsheet F, wherein $n$, $q$ and $Z$ are as hereinabove defined, R'' is hydrogen or lower alkyl, R''' is lower alkyl, and R'' and R''' taken together with the N(itrogen) is pyrrolidino, piperidino or morpholino.

In accordance with Flowsheet F, treatment of the chloroketone (XLVIII) with sodium iodide in refluxing acetone produces the iodoketo ester (L), mild saponification of which provides the corresponding acid (IL). Treatment of the iodoketone ester with thiourea, followed by treatment of the intermediate thiuronium salt with an equivalent of alkali affords the mercapto ketoester (LI), which on saponification gives the corresponding acid (LIII). Other transformations are preferably carried out after blocking the ring keto function as an ethylene ketal, thus the preparation of compound (LII). Reaction of ketal (LII) with potassium phthalimide in dimethylformamide (preferably at about 70°C. for about two hours) furnishes the phthalimido ketal (LIV). Deblocking of (LIV) to the amino ketoacid (LVI) is accomplished by first treating with potassium hydroxide in aqueous methanol followed by heating at reflux for about 18 hours with aqueous hydrochloric acid. Substituted amino groups can be introduced by treating iodo ketal (LII) with various amines

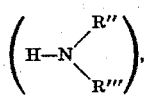

to give (LV) followed by ester and ketal hydrolysis to the amino ketoacids (LVII).

Additional transformations are illustrated in Flowsheet G, wherein n, p and q are as defined hereinbefore. The group $R_1'$ has all the possibilities that $R_1$ is defined above as having with the following exceptions: (e) a straight chain ω-mercaptoalkyl group having from three to six carbon atoms, (f) a straight chain ω-carboxyalkyl group having from three to six carbon atoms, (g) moieties of the formulae:

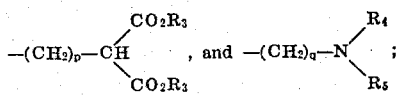

and the possibility of (d) a straight chain-haloalkyl group having from three to six carbon atoms is limited to an ω-chloroalkyl group. The synthesis of those compounds of this invention embodying at the same time Z as

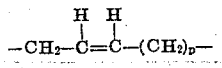

and the above exclusions for $R_1'$ can be accomplished by transformations of (LX) or (LXII) wherein $R_1'$ contains an ω-chloroalkyl group in the manner described above in Flowsheets E and F.

In Flowsheet G, which follows, the ring carbonyl function of the 2-(carbethoxymethyl)cyclopentanone (LVIII) is blocked by conversion to the ketal (LIX). The ester function in (LIX) is then reduced to an aldehyde by treatment with diisobutylaluminium hydride. This reaction is preferably carried out by addition of one molecular equivalent of this reagent to a solution of ester (LIX) in hexane or other hydrocarbon solvent, cooled to −78°C. After about 2.5 hours at this temperature the entire reaction mixture is poured quickly into aqueous excess mineral acid, and the product aldehyde (LXII) is obtaned upon immediate work-up in the usual way. The aldehyde (LXII) is then converted to (LX) by addition of (LXII) to the ylid prepared from the (ω-carboxyalkyl) triphenyl phosphonium bromide (LXI) and two molecular equivalents of sodium hydride in anhydrous dimethylsulfoxide. The use of dimethylsulfoxide as a solvent for this reaction leads to the predominant formation of the desired cis double bond in product (LX). The ketal blocking group in (LX) is then cleaved by treatment with acetone and p-toluenesulfonic acid producing the keto acid (LXIII).

FLOWSHEET G

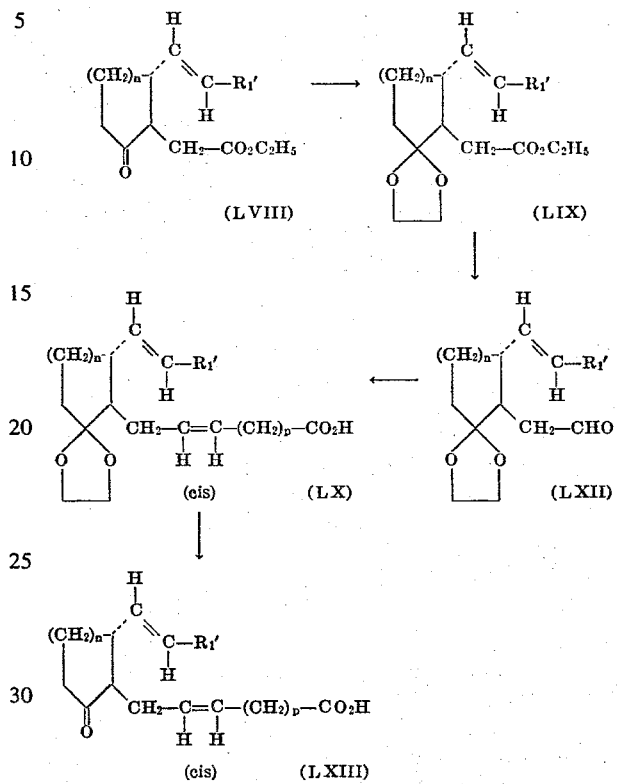

The various 9-hydroxy derivatives of this invention are prepared by reduction of the corresponding 9-keto ester or by subsequent transformations of the reduction product of the type recorded in Flowsheets E and F. Saponification of the ester provides the corresponding 9-hydroxy acids. The reduction is preferably carried out in the usual manner with sodium borohydride in ethanol as a solvent.

The prostanoic acids of this invention are convertable to the corresponding ester by first treating with thionyl chloride and then reacting the resulting acid chloride with an appropriate alcohol in the presence of an acid acceptor, e.g., diethylamine. The new ester can then undergo the transformations illustrated in Flowsheets E and F.

All of the compounds of this invention can be isolated and purified by conventional methods. Isolation can be accomplished, for example, by dilution of the reaction mixture with water, extraction with a water-immiscible solvent such as methylene chloride, ethyl acetate, benzene, cyclohexane, ether, toluene and the like, chromatography, adsorption on ion-exchange resins, distillation, or a combination of these. Purification of the compounds of this invention can be accomplished by means known in the art for the purification of prostaglandins and lipids, fatty acids, and fatty esters. For example, reverse phase partition chromatography, countercurrent distribution, adsorption chromatography on acid washed Florisil (synthetic magnesium silicate) and acid washed silica gel, preparative paper chromatography, preparative thin layer chromatography, chromatography over silver loaded cation exchange resins, and combinations thereof can be used effectively to purify the compounds produced by the processes of this invention.

The racemic products and intermediates of this invention can be resolved into their optically active components by a number of methods of resolution well known in the art. For example, compounds XXX, XXXV, XXXVI, XXXVIII, XLI, XLV, XLVII, IL, LIII, LVI, LVII and LXIII can all be obtained as free acids. These acids can be treated with an optically active base such as cinchonine, quinine, brucine, d- or l-α-phenylethylamine and the like to produce diastereoisomeric salts which can be separated by crystallization. Alternatively, the acid may be esterified with an optically active alcohol, e.g., d- or l-menthol, estradiol 3-acetate, etc., and the diastereoisomeric esters then resolved.

Resolution of the racemic prostaglandin-like compounds of this invention can also be accomplished by reverse phase and absorption chromatography on an optically active support and adsorbent and by selective transformation of one isomer with a biologically-active prostaglandin transforming system. Such transformations can be carried out by incubation or perfusion using methods well established in the art, followed by isolation and recovery of the isomer resistant to the metabolic transformation applied.

Also embraced within the scope of the present invention are the non-toxic, pharmaceutically acceptable salts of the novel compounds of the present invention when $R_2$ is hydroxy. The cations comprised in these salts include, for example, the non-toxic metal cations such as the sodium ion, potassium ion, calcium ion, and magnesium ion as well as the organic amine cations such as the tri(lower alkyl)amine cations (e.g., triethylamine), procaine, and the like.

The novel compounds of the present invention are obtainable as yellow oils having characteristic absorption spectra. They are relatively soluble in common organic solvents such as ethanol, ethyl acetate, dimethylformamide, and the like. The cationic salts of the compounds when $R_2$ is hydroxy are, in general, white to yellow crystalline solids having characteristic melting points and absorption spectra. They are relatively soluble in water, methanol, and ethanol but are relatively insoluble in benzene, diethyl ether, and petroleum ether.

The novel compounds of the present invention are useful as hypotensive agents and their prostaglandin-like hypotensive activity was demonstrated in the following test procedure. This procedure is a modification of the technique described by Pike et al., *Prostaglandins, Nobel Symposium* 2, Stockholm, June, 1966; p. 165.

Male Wistar strain rats (Royal Hart Farms) averaging approximately 250 grams in weight were fastened to rat boards in a supine position by means of canvas vests and limb ties. The femoral area was infiltrated subcutaneously with lidocaine and the iliac artery and vein were exposed and cannulated. Arterial blood pressure (systolic/diastolic) was recorded using a Statham $P_{23}$ Db pressure transducer-Offner dynograph system. To obtain a stable blood pressure, the animals were anesthetized before use with pentobarbitol, 30 mg./kg. of body weight intravenously, and also were given hexamethonium bitartrate, 2 mg./kg. of body weight intravenously. The test compounds were prepared by ultrasonic dispersion in a saline-Tween 80 vehicle. A constant intravenous dose volume of 0.5 ml. was administered and test doses ranged from 0.1 to 10.0 mg./kg. of body weight. Increasing or decreasing doses were selected depending on the dose response obtained. In Table I below are set forth the minimal doses required to produce a decrease of about 10 mm. in diastolic blood pressure for typical compounds of the present invention.

TABLE I

| Compound | Minimal Effective Dose (mg./kg. of body weight) |
| --- | --- |
| ethyl 9-oxo-13-trans-prostenoate | 0.5 |
| ethyl 20-butyl-9-oxo-13-trans-prostenoate | 10 |
| ethyl 20-chloro-9-oxo-13-trans-prostenoate | 0.5 |
| ethyl 9-oxo-20-nor-13-trans-prostenoate | 0.6 |
| ethyl 20-methyl-9-oxo-13-trans-prostenoate | 0.5 |
| ethyl 17-methyl-9-oxo-19,20-dinor-13-trans-prostenoate | 10 |
| ethyl 20-chloro-9-oxo-17,18,19-trinor-13-trans-prostenoate | 0.2–1 |
| ethyl 9-oxo-13-trans-17-cis-prostadienoate | 0.2–2 |
| ethyl 9-oxo-3,4,5,6,7-pentanor-13-trans-prostenoate | 8 |
| ethyl 9-oxo-10a-homo-13-trans-prostenoate | 2 |
| ethyl 9-oxo-18-thia-13-trans-prostenoate | 2 |
| ethyl 9-oxo-18-oxythia-13-trans-prostenoate | 2 |
| ethyl 20,20-dicarbethoxy-9-oxo-18,19-dinor-13-trans-prostenoate | 8 |
| 9-oxo-13-trans-prostenoic acid | 0.4 |
| 9-oxo-6,7-dinor-13-trans-prostenoic acid | 2 |
| 20-chloro-9-oxo-13-trans-prostenoic acid | 0.5 |
| 9-oxo-20-nor-13-trans-prostenoic acid | 0.5–1 |
| 20-methyl-9-oxo-13-trans-prostenoic acid | 0.5–2 |
| 17-methyl-9-oxo-19,20-dinor-13-trans-prostenoic acid | 0.5 |
| 20-chloro-9-oxo-17,18,19-trinor-13-trans-prostenoic acid | 2–8 |
| 9-oxo-13-trans-17-cis-prostadienoic acid | 0.2 |
| 9-oxo-3,4,5,6,7-pentanor-13-trans-prostenoic acid | 2 |
| 9-oxo-10a-homo-13-trans-prostenoic acid | 0.2 |
| 9-oxo-18-thia-13-trans-prostenoic acid | 0.2 |
| 9-oxo-18-oxythia-13-trans-prostenoic acid | 2–8 |
| 20-chloro-9-hydroxy-17,18,19-trinor-13-trans-prostenoic acid | 2 |
| 17-methyl-9-hydroxy-19,20-dinor-13-trans-prostenoic acid | 0.2–2 |
| 9-hydroxy-6,7-dinor-13-trans-prostenoic acid | 2 |
| 20-carboxy-9-oxo-18,19-dinor-13-trans-prostenoic acid | 8 |
| 18-oxa-9-oxo-13-trans-prostenoic acid | 2 |
| 3-pyridyl 9-oxo-13-trans-prostenoate | 0.4–4 |
| n-butyl 9-oxo-13-trans-prostenoate | 2 |
| β-dimethylaminoethyl 9-oxo-13-trans-prostenoate | 0.5–2 |
| 9-hydroxy-13-trans-prostenoic acid | 2 |

This hypotensive effect is short acting and a continuous infusion of compound is necessary to maintain the effect. Nevertheless, it is authoritatively claimed that hypotension induced by prostaglandins is of an ideal nature and therefore, despite the necessity of infusion, these compounds may be useful in the treatment of certain hypertensive crisis situations such as ecampsia. A description of this problem appears in The Medical Letter on Drugs and Therapeutics (p. 31–32, issue of April 3, 1970). Also, in a news item from *Medical World News*, 10, 12 (Aug. 1, 1969), Dr. J. B. Lee, associate professor of medicine at St. Louis University, is quoted as saying that the related prostaglandin A compounds "might be used in a hypertensive crisis such as eclampsia." The natural prostaglandins are only difficultly available, and at great cost. Thus, although the prostaglandin congeners and derivatives of this invention may be less potent and larger doses would probably be necessary, the greater availability of these compounds, when prepared by the methods of this invention, should provide a substantial economic advantage.

The novel compounds of the present invention are also useful as antimicrobial agents. They possess antibacterial and antifungal activity in vitro against a wide variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. A second set of agar dilutions is prepared identical to the first except that the nutrient agar is designed to support the growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria and yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial or fungal growth is noted. The minimal inhibitory concentration (expressed in micrograms per milliliter) is defined as the concentration of test compound causing complete inhibition of growth of any particular organism.

In a representative operation, and merely by way of illustration, the minimal inhibitory concentration of typical compounds of the present invention against a variety of test organisms as determined in the above-described assay are set forth in Tables II and III below:

TABLE II

| Compound | Minimal inhibitory conc. (mcg./ml.) | | | |
|---|---|---|---|---|
| | (1) | (2) | (3) | (4) |
| 9-oxo-13-trans-prostenoic acid | 50 | 50 | 50 | 50 |
| 9-oxo-18,19,20-trinor-13-trans-prostenoic acid | | 250 | 250 | 250 |
| ethyl 9-oxo-18,19,20-trinor-13-trans-prostenoate | | | | 250 |
| ethyl 15-methyl-9-oxo-17,18,19,20-tetranor-13-trans-prostenoate | 250 | 250 | 250 | 250 |
| 20-butyl-9-oxo-13-trans-prostenoic acicd | | | 250 | |
| ethyl 20-butyl-9-oxo-13-trans-prostenoate | | | 250 | |
| 20-chloro-9-oxo-13-trans-prostenoic acid | 250 | 62 | 16 | 62 |
| ethyl 20-chloro-9-oxo-13-trans-prostenoate | | | 250 | 250 |
| 9-oxo-20-nor-13-trans-prostenoic acid | 50 | 50 | 25 | 25 |
| 20-methyl-9-oxo-13-trans-prostenoic acid | 100 | 50 | 25 | 25 |
| 17-methyl-9-oxo-19,20-dinor-13-trans-prostenoic acid | 50 | 50 | 25 | 25 |
| 9-oxo-10a-homo-13-trans-prostenoic acid | | | 100 | 100 |
| ethyl 20-chloro-9-oxo-17,18,19-trinor-13-trans-prostenoate | | | | 250 |
| 20-chloro-9-oxo-17,18,19-trinor-13-trans-prostenoic acid | 250 | 250 | 250 | 250 |
| 9-oxo-6,7-dinor-13-trans-prostenoic acid | 250 | 250 | 250 | 250 |
| 9-hydroxy-13-trans-protenoic acid | 50 | 25 | 50 | 50 |
| β-dimethylaminoethyl 9-oxo-13-trans-prostenoate | 250 | | 250 | |
| ethyl 20-iodo-9-oxo-17,18,19-trinor-13-trans-prostenoate | | | 250 | 250 |
| 9-oxo-18-thia-13-trans-prostenic acid | | 250 | 125 | 125 |
| ethyl 9-oxo-18-oxythia-13-trans-prostenoate | | | 250 | 250 |
| 9-hydroxy-6,7-dinor-13-trans-prostenoic acid | 250 | 62 | 62 | 62 |
| 18-oxa-9-oxo-13-trans-prostenoic acid | | | 250 | 250 |
| 9-oxo-13-trans-17-cis-prostadienoic acid | 125 | 62 | 62 | 62 |
| 20-chloro-9-hydroxy-17,18,19-trinor-13-trans-prostenoic acid | | 250 | 250 | 250 |
| 17-methyl-9-hydroxy-19,20-dinor-13-trans-prostenoic acid | | 62 | 62 | 62 |
| ethyl 9-oxo-3,4,5,6,7-pentanor-13-trans-prostenoate | | | 250 | 125 |
| 20-mercapto-9-oxo-13-trans-prostenoic acid | | 125 | 250 | 250 |
| 9-oxo-3,4,5,6,7-pentanor-13-trans-prostenoic acid | 250 | 250 | 125 | 250 |

(1) *Microsporum canis* ATCC 10214
(2) *Microsporum gypseum* ATCC 14683
(3) *Trichophyton tonsurans* NIH 662
(4) *Trichophyton mentagrophytes* E 11

TABLE III

| Compound | Minimal inhibitory conc. (mcg./ml.) | | | |
|---|---|---|---|---|
| | (5) | (6) | (7) | (8) |
| 9-oxo-13-trans-prostenoic acid | 250 | 62 | 250 | 62 |
| 9-oxo-18,19,20-trinor-13-trans-prostenoic acid | | | | 250 |
| ethyl 9-oxo-18,19,20-trinor-13-trans-prostenoate | | 250 | | |
| ethyl 15-methyl-9-oxo-17,18,19,20-tetranor-13-trans-prostenoate | 250 | 62 | | |
| 20-butyl-9-oxo-13-trans-prostenoic acid | | | 10 | 10 |
| ethyl-20-butyl-9-oxo-13-trans-prostenoate | | | 250 | |

TABLE III — Continued

| Compound | Minimal inhibitory conc. (mcg./ml.) | | | |
|---|---|---|---|---|
| | (5) | (6) | (7) | (8) |
| 20-chloro-9-oxo-13-trans-prostenoic acid | 62 | 250 | 250 | 62 |
| ethyl 20-chloro-9-oxo-13-trans-prostenoate | 250 | 250 | | |
| ethyl 9-oxo-20-nor-13-trans-prostenoate | | 62 | | |
| 9-oxo-20-nor-13-trans-prostenoic acid | 50 | 62 | 250 | 62 |
| 20-methyl-9-oxo-13-trans-prostenoic acid | 100 | 25 | 50 | 10 |
| ethyl 17-methyl-9-oxo-19,20-dinor-13-trans-prostenoate | | 62 | | |
| 17-methyl-9-oxo-19,20-dinor-13-trans-prostenoic acid | 50 | 62 | 250 | 62 |
| 9-oxo-10a-homo-13-trans-prostenoic acid | | 25 | 100 | 10 |
| ethyl 20-chloro-9-oxo-17,18,19-trinor-13-trans-prostenoate | | 250 | | |
| 20-chloro-9-oxo-17,18,19-trinor-13-trans-prostenoic acid | 250 | | | |
| 3-pyridyl 9-oxo-13-trans-prostenoate | | 50 | | |
| ethyl 9-oxo-18-thia-13-trans-prostenoate | | 250 | | |
| n-butyl 9-oxo-13-trans-prostenoate | | 250 | | 250 |
| ethyl 9-oxo-6,7-dinor-13-trans-prostenoate | | 250 | | |
| 9-oxo-6,7-dinor-13-trans-prostenoic acid | 250 | 250 | 250 | 250 |
| 9-hydroxy-13-trans-prostenoic acid | | 25 | 50 | 25 |
| β-dimethylaminoethyl 9-oxo-13-trans-prostenoate | | 10 | 50 | 10 |
| ethyl 9-hydroxy-13-trans-prostenoate | | 25 | | |
| ethyl 20-iodo-9-oxo-17,18,19-trinor-13-trans-prostenoate | | 62 | | |
| ethyl 20-iodo-9-oxo-13-trans-prostenoate | | 62 | | |
| 9-oxo-18-thia-13-trans-prostenoic acid | | 250 | | |
| ethyl 20,20-dicarbethoxy-9-oxo-18,19-dinor-13-trans-prostenoate | | 250 | | |
| ethyl 9-oxo-18-oxythia-13-trans-prostenoate | 250 | 250 | | |
| ethyl 9-hydroxy-6,7-dinor-13-trans-prostenoate | | 6 | | 13 |
| 9-hydroxy-6,7-dinor-13-trans-prostenoic acid | 250 | 62 | 250 | 62 |
| 9-oxo-13-trans-cis-prostadienoic acid | 125 | 62 | 250 | 62 |
| 20-chloro-9-hydroxy-17,18,19-trinor-13-trans-prostenoic acid | | | | 62 |
| 17-methyl-9-hydroxy-19,20-dinor-13-trans-prostenoic acid | 250 | 62 | 125 | 25 |
| ethyl 9-oxo-3,4,5,6,7-pentanor-13-trans-prostenoate | | 125 | | 125 |
| 20-mercapto-9-oxo-13-trans-prostenoic acid | | 125 | | 6 |
| 9-oxo-3,4,5,6,7-pentanor-13-trans-prostenoic acid | 250 | | | |

(5) *Trichophyton rubrum* E 97
(6) *Mycobacterium smegmatis* ATCC 606
(7) *Staphylococcus aureus* Rose ATCC 14154
(8) *Streptococcus pyogenes* C 203

Topical preparations containing the novel compounds of the present invention or cationic salts thereof when $R_2$ is hydroxy, it is expected, will prove particularly useful. Such compositions would be designed for administration to subjects exposed to, or infected with sensitive bacteria or fungi for either treatment or prophylaxis and may include ointments, creams, emulsions, unguents, salves, emollients, sprays, washes or the like. In addition, the compounds may be used in the form of solutions, suspensions, emulsions, washes, powders, dusts, mists, soaps, sprays, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays, or the like in the home, farm, office or elsewhere with the purpose of preventing or minimizing infection or contamination with sensitive bacteria or fungi. Painting, spraying, immersion or other means of effecting contact may be applied.

The novel compounds of the present invention also possess activity as anti-inflammatory agents, fertility controlling agents, central nervous system regulatory agents, salt- and water-retention regulatory agents, fat metabolic regulatory agents, serum cholesterol-lowering agents and as abortifacients, anticonvulsants, bronchodilators and gastric acid secretion inhibitors.

Certain of the novel compounds disclosed herein possess utility as intermediates for the novel compounds of the present invention.

In accordance with accepted convention, a α-substituent at the 9-position is behind the plane of the paper whereas a β-substituent at the 9-position is in front of the plane of the paper. This is usually represented by a - - - bond for an α-substituent, a — bond for a β-substituent, and a ⁓ bond where both are indicated. Thus, the 9-hydroxy derivatives may be variously represented as follows:

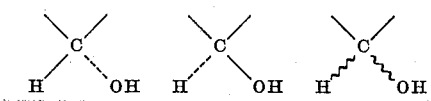

The invention will be described in greater detail in conjunction with the following specific examples.

EXAMPLE 1

Preparation of 2-carbalkoxy(methyl/ethyl)-2-(4-carbethoxybutyl)-cyclopentan-1-one To a stirred solution of the sodium cyclopentanone carboxylate enolate in dimethoxyethane, prepared from 187 g. (1.248 moles) of 2-cyclopentanone carboxylate (mixed methyl and ethyl esters), 52.4 g. (1.248 moles) sodium hydride (57.2% in mineral oil) and 1.6 l. of dimethoxyethane, is added dropwise 309 g. (1.212 moles) of ethyl 5-iodovalerate. The reaction mixture is stirred and heated at a reflux for 18 hours. The mixture is cooled and filtered. The solvent is removed from the filtrate by evaporation and the residue is poured into dilute hydrochloric acid and extracted with ether. The combined extracts are washed with water and saline, dried over magnesium sulfate and evaporated to give an oil. The oil is distilled under reduced pressure to give 274 g. of a light yellow oil, b.p. 140°–143°C. (0.17 mm).

EXAMPLE 2

Preparation of 2-(4-carboxybutyl)cyclopentan-1-one

A stirred mixture of 274 g. of 2-carbalkoxyl(mixed methyl and ethyl esters)-2-(4-carbethoxybutyl)cyclopentan-1-one (Example 1), 600 ml. of 20% hydrochloric acid and 325 ml. of acetic acid is heated at reflux for 20 hours. Solution occurs in approximately ½ hour. The solution is cooled and diluted with water and extracted with ether. The combined extracts are wshed with saline and dried over magnesium sulfate and evaporated. The residue is evaporated twice with toluene to give 144 g. of an oil.

EXAMPLE 3

Preparation of 2-(4-carbethoxybutyl)cyclopentan-1-one

A stirred solution of 124 g. (0.673 mole) of 2-(4-carboxybutyl)cyclopentan-1-one (Example 2), 800 ml. of ethanol and 1 g. of p-toluenesulfonic acid monohydrate is heated at reflux for 18 hours. The solvent is evaporated and the residue is dissolved in ether. The ether solution is washed with saline, dilute sodium bicarbonate solution and again with saline, dried over magnesium sulfate and evaporated. The oil is distilled under reduced pressure to give 149 g. of a colorless oil, b.p. 106°–109°C. (0.23 mm).

EXAMPLE 4

Preparation of 2-carbalkoxy(methyl/ethyl)-2-(3-carbethoxypropyl)-cyclopentan-1-one In the manner described in Example 1, treatment of 2-cyclopentanone carboxylate (mixed methyl and ethyl esters) with sodium hydride in dimethoxyethane followed by ethyl 4-iodobutyrate gives a yellow oil, b.p. 136°–137°C. (0.16 mm).

EXAMPLE 5

Preparation of 2-(3-carboxypropyl)cyclopentan-1-one

In the manner described in Example 2, treatment of 2-carbalkoxy(mixed methyl and ethyl esters)-2-(3-carbethoxypropyl)cyclopentan-1-one (Example 4) with a 20% hydrochloric acid and acetic acid mixture gives a yellow oil.

EXAMPLE 6 Preparation of 2-(4-carbethoxypropyl)cyclopentan-1-one

In the manner described in Example 3, treatment of 2-(3-carboxypropyl)cyclopentan-1-one (Example 5) with p-toluene-sulfonic acid monohydrate in ethanol gives a colorless oil, b.p. 93°C. (0.10 mm).

EXAMPLE 7

Preparation of ethyl and methyl 2-(6-carbethoxyhexyl)-1-cyclopentanon-2-carboxylate In the manner described in Example 1, ethyl and methyl 2-cyclopentanone carboxylate is reacted with ethyl 7-bromoheptanoate to furnish the subject product, b.p. 147°C. (0.09 mm).

EXAMPLE 8

Preparation of 2-(6-carboxyhexyl)cyclopentan-1-one

In the manner described in Example 2, ethyl and methyl 2-(6-carbethoxyhexyl)-1-cyclopentanone-2-carboxylate (Example 7) is hydrolyzed to furnish the subject product, b.p. 143°C. (0.05 mm).

EXAMPLE 9

Preparation of 2-(6-carbethoxyhexyl)cyclopentan-1-one

In the manner described in Example 3, 2-(6-carboxyhexyl)cyclopentan-1-one (Example 8) is esterified to furnish the subject product, b.p. 110°C. (0.03 mm).

EXAMPLE 10

Preparation of ethyl (methyl) 7-(2-carbethoxycyclohexan-1-on-2-yl)heptanoate

To a stirred suspension of 51 g. of sodium hydride (57% in mineral oil) in 675 ml. of dimethylformamide is added 200 g. of 2-cyclohexanone carboxylate (60% ethyl — 40% methyl esters) over a 1–5 hr. period with external cooling to maintain the temperature at 20°–25°C. The reaction mixture is stirred at ambient temperature for 15 minutes and heated to 50°C. over 15 minutes. To the stirred mixture is added 300 g. of ethyl 7-bromoheptanoate during a 10 minute period. The reaction mixture is stirred at 50°–60°C. for 4 hours, cooled, and poured into water. The product is obtained by ether extraction. The extract is washed successively with water and saturated sodium chloride, dried and evaporated to give a liquid which is purified by distillation, IR 1735 cm$^{-1}$ (ester carbonyls) and 1710 cm$^{-1}$ (ketone carbonyl).

EXAMPLE 11

Preparation of 7-(cyclohexan-1-on-2-yl)heptanoic acid

A stirred mixture of 380 g. of mixed methyl and ethyl esters of 7-(2-carbethoxycyclohexan-1-on-2-yl)heptanoate (Example 10), 202 ml. of concentrated sulfuric acid, 970 ml. of glacial acetic acid, and 970 ml. of water is refluxed for 22.5 hours. The cooled reaction mixture is treated with 380 g. of sodium carbonate and 2 liters of water and is extracted with ether. Acidic material is partitioned from the ether extract with 1.0M sodium carbonate. The aqueous phase is acidified with concentrated hydrochloric acid and extracted with ether. The extract is washed successively with water and saturated sodium chloride, dried, and evaporated to give an oil.

EXAMPLE 12

Preparation of ethyl 7-(cyclohexan-1-on-2-yl)heptanoate

A solution of 232 g. of 7-(cyclohexan-1-on-2-yl)heptanoic acid in 2500 ml. of ethanol is refluxed for 4.5 hours with 3.8 g. of p-toluenesulfonic acid monohydrate. The solution is diluted with 200 ml. of benzene, and boiling is continued for 2 hours as 200 ml. of distillate is removed. The volume of the solution is concentrated to 500 ml. After dilution with 500 ml. of ether the solution is extracted with a solution prepared from 50 ml. of saturated sodium bicarbonate, 50 ml. of saturated sodium chloride, and 100 ml. of water. The extract is washed with saturated sodium chloride, dried, and evaporated. The product is purified by distillation to give a liquid, IR 1740 cm$^{-1}$ (ester carbonyl) and 1715 cm$^{-1}$ (ketone carbonyl).

EXAMPLE 13

Preparation of 2-carbalkoxy(methyl/ethyl)-2-(3-carbethoxypropyl)-cyclohexan-1-one The subject compound is prepared in the manner described in Example 10 by treatment of 2-cyclohexanone carboxylate (mixed methyl and ethyl esters) with sodium hydride and ethyl 4-iodobutyrate.

EXAMPLE 14

Preparation of 2-(3-carbethoxypropyl)cyclohexan-1-one

This compound is prepared from 2-carbalkoxy(methyl/-ethyl)-2-(3-carbethoxypropyl)cyclohexan-1-one (Example 13) by decarbalkoxylation according to the procedure described in Example 11 followed by esterification by the procedure of Example 12.

EXAMPLE 15

Preparation of 2-(5-carbethoxypentyl)cyclohexan-1-one

This compound is prepared by alkylation of 2-cyclohexanone carboxylate (mixed methyl and ethyl esters) with ethyl 6-bromohexanoate according to the procedure of Example 10, followed by decarbalkoxylation according to the procedure of Example 11 and finally esterification by the procedure of Example 12.

EXAMPLE 16

Preparation of 2-(7-carbethoxyheptyl)cyclohexan-1-one

Alkylation of 2-cyclohexanone carboxylate (mixed methyl and ethyl esters) with ethyl 8-bromoctanoate in accordance with the procedure of Example 10, followed by decarbalkoxylation by the procedure of Example 11 and then esterification by the procedure of Example 12 is productive of the subject compound.

EXAMPLE 17

Preparation of 2-carbalkoxy(methyl/ethyl)-2-(carbethoxymethyl)-cyclopentan-1-one In the manner described in Example 1, treatment of cyclopentanone-2-carboxylate (mixed methyl and ethyl esters) with sodium hydride in dimethoxyethane followed by ethyl bromoacetate provides a yellow oil, b.p. 130°–131°C. (7 mm).

EXAMPLE 18

Preparation of 2-(carboxymethyl)cyclopentan-1-one

In the manner described in Example 2, the 2-carbalkoxy-2-carbethoxymethylcyclopentanone of Example 17 is decarbalkoxylated to provide 2-carboxymethylcyclopentan-1-one.

EXAMPLE 19

Preparation of 2-carbethoxymethylcyclopentan-1-one

In the manner of Example 3, 2-(carboxymethyl)cyclopentan-1-one (Example 18) is esterified to provide the subject ester.

EXAMPLE 20

Preparation of 1-acetoxy-2-(6-carbethoxyhexyl)cyclopent-1-ene

A stirred solution of 100 g. of 2-(6-carbethoxyhexyl)-cyclopentan-1-one (Example 9) in 250 ml. of acetic anhydride containing 0.940 g. of p-toluenesulfonic acid monohydrate is heated to boiling under partial reflux allowing distillate at 118°C. or less (i.e., acetic acid) to escape through a Vigreaux column equipped with a condenser to collect the distillate. After 16 hours, during which period acetic anhydride is added in portions in order to keep the solvent level at at least 100 ml., the solution is cooled and poured cautiously into a stirred cold mixture of saturated sodium bicarbonate solution (400 ml.) and hexane (250 ml.). The resulting mixture is stirred for an additional 30 minutes during which period solid sodium bicarbonate is added periodically to insure a basic solution. The hexane layer is separated and washed with saturated sodium chloride solution, dried with anhydrous magnesium sulfate and taken to dryness. Distillation of the residual oil gives 102 g. (87%) of pale yellow oil, b.p. 118°C. (0.07 mm).

EXAMPLE 21

Preparation of 1-acetoxy-2-(carbethoxymethyl)cyclopent-1-ene

In the manner described in Example 20, treatment of 2-(carbethoxymethyl)cyclopentan-1-one (Example 19) with acetic anhydride and p-toluenesulfonic acid monohydrate gives an oil, b.p. 130°–131°C. (7 mm).

EXAMPLE 22

Preparation of 1-acetoxy-2-(3-carbethoxypropyl)cyclopent-1-ene

In the manner described in Example 20, treatment of 2-(3-carbethoxypropyl)cyclopentan-1-one (Example 6) with acetic anhydride and p-toluenesulfonic acid monohydrate gives a yellow oil, b.p. 98°–103°C. (0.35 mm).

EXAMPLE 23

Preparation of 1-acetoxy-2-(4-carbethoxybutyl)cyclopent-1-ene

In the manner described in Example 20, treatment of 2-(4-carbethoxybutyl)cyclopentan-1-one (Example 3) with acetic anhydride and p-toluenesulfonic acid monohydrate gives a yellow oil, b.p. 109°–110°C. (0.37 mm).

EXAMPLE 24

Preparation of ethyl 7-(1-acetoxycyclohex-1-en-2-yl)heptanoate

A stirred solution of 28.0 g. of ethyl 7-(cyclohexan-1-on-2-yl)heptanoate (Example 12), 170 mg. of p-toluenesulfonic acid monohydrate, and 25.6 g. of acetic anhydride is heated for 5 hours while allowing 8.0 g. of distillate to distill. The cooled solution is poured into a stirred, ice-cold mixture of 500 ml. of saturated sodium bicarbonate and 250 ml. of hexane. After one hour the hexane phase is separated, dried, and evaporated. The crude product is distilled to give a liquid, IR 1760 cm$^{-1}$ (vinyl ester carbonyl) and 1740 cm$^{-1}$ (ethyl ester carbonyl).

EXAMPLE 25

Preparation of 1-acetoxy-2-(3-carbethoxypropyl)cyclohex-1-ene

Treatment of 2-(3-carbethoxypropyl)cyclohexan-1-one (Example 14) with acetic anhydride by the procedure of Example 24 is productive of the subject compound.

EXAMPLE 26

Preparation of 1-acetoxy-2-(5-carbethoxypentyl)cyclohex-1-ene

Treatment of 2-(5-carbethoxypentyl)cyclohexan-1-one (Example 15) with acetic anhydride by the procedure of Example 24 is productive of the subject compound.

EXAMPLE 27

Preparation of 1-acetoxy-2-(7-carbethoxyheptyl)cyclohex-1-ene

Treatment of 2-(7-carbethoxyheptyl)cyclohexan-1-one (Example 16) with acetic anhydride by the procedure of Example 24 is productive of the subject compound.

EXAMPLE 28

Preparation of 2-(6-carbethoxyhexyl)cyclopent-2-en-1-one

To a rapidly stirred mixture of 50 g. of 1-acetoxy-2-(6-carbethoxyhexyl)cyclopent-1-ene (Example 20) in 150 ml. of chloroform, 200 ml. of water and 18.8 g of calcium carbonate, cooled in an ice bath, is added dropwise over a period of about 30 minutes, a solution of 30 g. of bromine in 50 ml. of carbon tetrachloride. After stirring for an additional 45 minutes the chloroform layer is separated and washed successively with dilute sodium thiosulfate solution, saturated sodium chloride solution, dried with anhydrous magnesium sulfate and taken to dryness under reduced pressure.

The residual oil is dissolved in 50 ml. of N,NN,N-dimethylformamide and added to a mixture of 33 g. of lithium bromide and 32 g. of lithium carbonate in 375 ml. of N,N-dimethylformamide, previously dried by refluxing with 375 ml. of benzene under a Dean-Stark apparatus followed by distillation of the benzene. The mixture is stirred at the reflux temperature for 30 minutes, then cooled and poured into 850 ml. of ice-cold water. The resulting mixture is acidified (cautiously) with 4N hydrochloric acid and extracted with ether three times. The combined ether extracts are washed with saturated sodium chloride solution, dried with anhydrous magnesium sulfate and taken to dryness under reduced pressure to afford 41.5 g of an amber oil. In order to convert any isomeric material to the desired product, 41.5 g. of the above material is treated with 0.500 g. of p-toluenesulfonic acid monohydrate in 450 ml. of absolute alcohol at the reflux temperature for 18 hours. The solution is taken to dryness under reduced pressure. The resulting gum is dissolved in ether and washed with saturated sodium bicarbonate solution, saturated sodium chloride solution, dried with anhydrous magnesium sulfate and taken to dryness under reduced pressure. The residual oil is distilled to give 30.2 g. of product; b.p. 118°C. (0.05 mm); $\lambda_{max}^{MeOH}$ 229 m$\mu$ ($\epsilon$9950); $\lambda_{max}$ 5.75, 5.85, 6.15, 8.45 $\mu$; vapor phase chromatography shows 99% product, containing 1% 2-(6-carbethoxyhexyl)cyclopentan-1-one.

This product can be purified by the following procedure. A mixture of 120 g. of 2-(6-carbethoxyhexyl)-2-cyclopentenone, containing approximately 5% of the saturated analogue, and 7.67 g. (10 mole percent) of p-carboxyphenylhydrazine in 400 ml. of absolute ethanol is stirred at ambient temperatures for 18 hours and is then refluxed for 1 hours. The mixture is cooled, the solvent is evaporated, and the residue is taken up into 150 ml. of chloroform and passed through a column of 450 g. of aluminum oxide (Merck). The filtrate is evaporated to yield a colorless oil containing <0.5% of the saturated impurity.

EXAMPLE 29

Preparation of 2-(carbethoxymethyl)cyclopent-2-en-1-one

In the manner described in Example 28, treatment of 1-acetoxy-2-(carbethoxymethyl)cyclopent-1-ene (Example 21) with bromine and subsequent dehydrobromination with lithium bromide-lithium carbonate in N,N-dimethylformamide gives an amber oil. This material is subjected to chromatography on diatomaceous earth using an n-heptane:methyl cellosolve system. Removal of the solvent from hold back volume 4.5–4.7 gives an oil which is then further treated with hydroxylamine hydrochloride, sodium acetate in ethanol at room temperature for 18 hours to give the desired product; b.p. 71°C. (0.12 mm); $\lambda_{max}^{MeOH}$ 222 $\mu$ (10,300); $\lambda_{max}$ 5.75, 5.85, 6.15, 8.65 $\mu$.

EXAMPLE 30

Preparation of 2-(3-carbethoxypropyl)cyclopent-2-en-1-one

In the manner described in Example 28, bromination of 1-acetoxy-2-(3-carbethoxypropyl)cyclopent-1-ene (Example 22) followed by dehydrobromination with lithium bromide and lithium carbonate is productive of the subject compound.

EXAMPLE 31

Preparation of 2-(4-carbethoxybutyl)cyclopent-2-en-1-one

In the manner described in Example 28, treatment of 1-acetoxy-2-(4-carbethoxybutyl)cyclopent-1-ene (Example 23) with bromine and subsequent treatment of the brominated product with a mixture of lithium bromide and lithium carbonate in N,N-dimethylformamide is productive of the subject compound. Treatment of this product with p-carboxyphenylhydrazine by the precedure of Example 28 furnishes a product which contains less than 0.5% of the corresponding saturated ketone.

EXAMPLE 32

Preparation of 1-methoximino-2-(6-carbethoxyhexyl)-2-cyclopentene

To a mixture of 35.97 g. (0.151 mole) of 2-(6-carbethoxyhexyl)-2-cyclopentenone (Example 28) and 15.0 g. (0.180 mole) of methoxyamine hydrochloride in 300 ml. of absolute ethanol is added 25 ml. of pyridine and the resulting solution is stirred for 20 hours at ambient temperatures. The solvent is evaporated and the residue is partitioned between water and diethyl ether. The organic phase is washed with water and saturated brine, dried ($Na_2SO_4$), and the solvent is evaporated to yield an oil. Distillation yields 38.7 g. of a colorless oil, b.p. 115°–118°C. (0.075 mm). IR (film): 1740, 1627, 1053, 890 cm$^{-1}$. $\lambda_{max}$ (MeOH) 243 (13,000). NMR$\delta$($CDCl_3$): 3.89.

EXAMPLE 33

Preparation of 1-methoximino-2-(7-hydroxyheptyl)-2-cyclopentene

To an ice cooled solution of 34.10 g. (0.128 mole of 1-methoximino-2-(6-carbethoxyhexyl)-2-cyclopentene (Example 32) in 200 ml. of benzene under nitrogen is added dropwise 225 ml. of a 25% solution of diisobutyl aluminum hydride in hexane. The resulting solution is stirred for 2 hours at 0°–5°C., poured onto ice and dilute hydrochloric acid, and the aqueous phase is saturated with sodium chloride. The organic phase is separated, washed with saturated brine, dried ($Na_2SO_4$), and evaporated to yield an oil. The latter is dissolved in 100 ml. of hot hexane and cooled to yield 24.3 g. of crystals, m.p. 62°–64°C. IR (KBr) 3260, 1630, 1059, 893 cm$^{-1}$. $\lambda_{max}$ 243 (14,200). NMR ($CDCl_3$)$\delta$: 2.37.

EXAMPLE 34

Preparation of 1-methoximino-2-(7-p-toluenesulfonyloxyheptyl)-2-cyclopentene

To a solution of 5.00 g. (0.0222 mole) of 1-methoximino-2-(7-hydroxyheptyl)-2-cyclopentene (Example 33) in 50 ml. of dry pyridine at 0°C. is added 8.45 g. (0.0444 mole) of p-toluenesulfonyl chloride and the resulting solution is chilled at 50°C. overnight. The mixture is partitioned between 300 ml. of ice water and diethyl ether. The organic phase is washed with 1:1 ice cold hydrochloric acid, cold water, and cold saturated brine, dried ($NaSO_4/K_2CO_3$), and evaporated under reduced pressure at room temperature to yield an oil. The latter is dissolved in 600 ml. of hexane, treated with 0.5 g. of Darco, filtered and evaporated to yield 7.7 g. of a colorless oil. IR (film) 1600, 1192, 1182, 1053, 890 cm$^{-1}$. $\lambda_{max}$ (MeOH) 228 and 243.

EXAMPLE 35

Preparation of 1-methoximino-2-(8,8-dicarbethoxyoctyl)-2cyclopentene

To an alcoholic solution of sodiodiethyl malonate, prepared from 0.847 g. (0.036 g. atoms) of sodium, 100 ml. of absolute ethanol, and 7.05 g. (0.0440 mole) of diethyl malonate is added 7.7 g. of the tosylate of Example 34 and the mixture is refluxed for 2 hours under a nitrogen atmosphere. The mixture is partitioned between cold dilute hydrochloric acid and diethyl ether, and the organic phase is washed with water and saturated brine, dried ($Na_2SO_4$), and evaporated to yield an oil. The excess diethyl malonate is distilled off under reduced pressure to yield 6.47 g. of a yellowish oil. IR (film) 1755, 1728, 1625, 1054, 890 cm$^{-1}$.

EXAMPLE 36

Preparation of 1-methoximino-2-(8,8-dicarboxyoctyl)-2-cyclopentene

A mixture of 6.45 g. of the diester of Example 35 and 6.72 g. of potassium hydroxide in 150 ml. of 1:1 aqueous methanol is refluxed for 1 hour, cooled, and is partitioned between water and diethyl ether. The aqueous phase is acidified with hydrochloric acid, extracted with ether, and the organic phase is washed with water anad saturated brine, dried ($Na_2SO_4$) and evaporated to yield a solid. The solid is crystallized from benzene to yield 4.15 g. of tan crystals, m.p. 135°–137°C. ($-CO_2$).

EXAMPLE 37

Preparation of 1-methoximino-2-(8-carboxyoctyl)-2-cyclopentene

A solution of 3.926 g. (0.0126 mole) of the diacid of Example 36 in 20 ml. of xylene is refluxed for 1.5 hours, cooled, and evaporated to yield a tan solid. IR (KBr) 1720, 1618, 1179, 1050, 986 cm$^{-1}$.

EXAMPLE 38

Preparation of 2-(8-carboxyoctyl)cycopent-2-en-1-one

The acid methoxime from Example 37 is refluxed for 5 hours with 55 ml. of acetone and 20 ml. of 2N hydrochloric acid. The mixture is cooled, the solvent is evaporated, and the residue is partitioned between water and diethyl ether. The organic phase is washed with water and saturated brine, dried ($Na_2SO_4$), and evaporated to yield a tan solid. IR (KBr) 1745, 1665 cm$^{-1}$. $\lambda_{max}$ (MeOH) 228 (12,600).

EXAMPLE 39

Preparation of 2-(8-carbethoxyoctyl)cyclopent-2-en-1-one

The acid ketone from Example 38 is Fisher esterified with 100 ml. of absolute ethanol, 100 ml. of benzene, and 20 mg. of p-toluenesulfonic acid for 6 hours, cooled, and the solvent is evaporated. The resulting oil is dissolved in 3:1 benzene-ether and the solution is passed through a column of 100 g. of Florisil. The filtrate is evaporated and the residue is distilled to yield 2.97 g. of a colorless oil, b.p. 137°–139°C. (0.05 Torr).

EXAMPLE 40

Preparation of ethyl 7-(cyclohex-2-en-1-one-2-yl)heptanoate

To a stirred solution of ethyl 7-(1-acetoxycyclohex-1-en-2-yl)heptanoate (Example 24) in 750 ml. of acetic acid and 125 ml. of pyridine at 10°C. is added a solution of 13.8 g. of bromine in 200 ml. of acetic acid over 20 minutes. The resulting solution is allowed to stand at ambient temperature for 45 minutes and is then decolorized with sodium sulfite. The solution is poured into 800 ml. of half-saturated sodium chloride and extracted with 1:1 hexane-ether. The extract is washed successively with water and saturated sodium chloride, dried over sodium carbonate, and evaporated to give 32 g. of the crude bromoketone. To a stirred suspension of 14.2 g. of lithium bromide and 16.6 g. of lithium carbonate in 250 ml. of anhydrous dimethylformamide at 80°C. is added the above bromoketone. The stirred mixture is heated to boiling over 20 minutes and refluxed for 15 minutes. The cooled mixture is poured into 1000 ml. of water, acidified with dilute hydrochloric acid, and extracted with ether. The extract is washed successively with water and saturated sodium chloride, dried, and evaporated. The product is purified by distillation to give a liquid, IR 1740 cm$^{-1}$ (ester carbonyl), 1685 cm$^{-1}$ (ketone carbonyl), and 1650 cm$^{-1}$ (olefin); NMR (CCl$_4$) 6.63 (multiplet, vinyl proton).

EXAMPLE 41

Preparation of 2-(3-carbethoxypropyl)cyclohex-2-en-1-one

In accordance with the procedure of Example 40, bromination of 1-acetoxy-2-(3-carbethoxypropyl)cyclohex-1-ene (Example 25) followed by treatment with lithium bromide and lithium carbonate is productive of the subject compound.

EXAMPLE 42

Preparation of 2-(5-carbethoxypentyl)cyclohex-2-en-1-one

By the procedure of Example 40, bromination of 1-acetoxy-2-(5-carbethoxypentyl)cyclohex-1-ene (Example 26) followed by treatment with lithium bromide and lithium carbonate is productive of the subject compound.

EXAMPLE 43

Preparation of 2-(7-carbethoxyheptyl)cyclohex-1-en-2-one

By the procedure of Example 40, bromination of 1-acetoxy-2-(7-carbethoxyheptyl)cyclohex-1-ene (Example 27) followed by treatment with lithium bromide and lithium carbonate is productive of the subject compound.

EXAMPLE 44

Preparation of ethyl 9-oxo-13-trans-prostenoate

A solution of 1.102 g. of 1-octyne in 2 ml. of benzene is treated with 11.5 ml. of 15% diisobutylaluminum hydride in toluene and the solution is heated to 50°C. for 2 hours. The solution is cooled, its solvent is removed in vacuo, and the resulting oil is treated with 5.45 ml. of 5.10% methyl lithium in diethyl ether with ice cooling. To the resulting solution is added 1.830 g. of 2-(6-carbethoxyhexyl)-2-cyclopentenone (Example 28) and the solution is stirred at ambient temperatures for 18 hours. The solution is poured onto ice and dilute hydrochloric acid, and the mixture is extracted with diethyl ether. The organic phase is washed with dilute sodium bicarbonate, water, and saturated brine, dried, and evaporated. The residue is purified by chromatography on Florisil and distillation to yield 1.878 g. of an oil, IR 1736 cm$^{-1}$ (ester and ketone carbonyls) 969 cm$^{-1}$ (trans vinyl group); NMR (CDCl$_3$) δ5.14-5.87 (multiplet, 2H, vinyl protons, J trans = 15 Hz); Mass Spectrum, parent peak at 350 mμ.

EXAMPLE 45

Preparation of ethyl 20-butyl-9-oxo-13-trans-prostenoate

In the manner described in Example 44, 2-(6-carbethoxyhexyl)-2-cyclopentenone (Example 28) is added to the reagent prepared from 1-dodecyne, diisobutylaluminum hydride, and methyl lithium. The crude product obtained by acid hydrolysis and ether extraction is purified by silica gel chromatography to give an oil, IR 1740 cm$^{-1}$ (ester and ketone carbonyls) 967 cm$^{-1}$ (trans vinyl group).

EXAMPLE 46

Preparation of ethyl 9-oxo-18,19,20-trinor-13-trans-prostenoate

In the manner described in Example 44, 2-(6-carbethoxyhexyl)-2-cyclopentenone (Example 28) is added to the reagent prepared from 1-pentyne, diisobutylaluminum hydride, and methyl lithium. The crude product obtained by acid hydrolysis and ether extraction is purified by distillation to give a liquid, IR 1740 cm$^{-1}$ (ester and ketone carbonyl) 967 cm$^{-1}$ (trans vinyl group).

EXAMPLE 47

Preparation of ethyl 15-methyl-9-oxo-17,18,19,20-tetranor-13-trans-prostenoate

In the manner described in Example 44, 2-(6-carbethoxyhexyl)-2-cyclopentenone (example 28) is added to the reagent prepared from 3-methyl-1-butyne, diisobutylaluminum hydride, and methyl lithium. The crude product obtained by acid hydrolysis and ether extraction is purified by distillation to give a liquid, IR 1740 cm$^{-1}$ (ester and ketone carbonyls) 967 cm$^{-1}$ (trans vinyl group).

EXAMPLE 48

Preparation of ethyl 20-chloro-9-oxo-13-trans-prostenoate

In the manner described in Example 44, 2-(6-carbethoxyhexyl)-2-cyclopentenone (Example 28) is added to the reagent prepared from 8-chloro-1-octyne [W. J. Gensler and G. R. Thomas, J. Amer. Chem. Soc., 73, 4601 (1951)], diisobutylaluminum hydride, and methyl lithium. The crude product obtained by acid hydrolysis is purified by silica gel chromatography to give an oil, IR 1740 cm$^{-1}$ (ester and ketone carbonyls), 967 cm$^{-1}$ (trans vinyl group).

EXAMPLE 49

Preparation of ethyl 9-oxo-20-nor-13-trans-prostenoate

A solution of 5.30 g. of 1-heptyne in 10 ml. of benzene is treated with 40 ml. of 1.2N diisobutylaluminum hydride in hexane and heated at 50°C. for 2 hours. The solution is cooled in an ice bath and diluted with 25 ml. of ether. To the solution is added 30 ml. of 1.6M n-butyl lithium in hexane. After stirring for 20 minutes at 15°–25°C. the resulting solution is treated with a solution of 2-(6-carbethoxyhexyl)-2-cyclopentenone (Example 28). The mixture is stirred at 5°–25°C. for 18-20 hours and the product then is hydrolyzed with a mixture of ice and hydrochloric acid. The crude product, obtained from the organic phase, is purified by chromatography on silica gel to give an oil, IR 1740 cm$^{-1}$ (ester and ketone carbonyls) and 967 cm$^{-1}$ (trans vinyl group).

EXAMPLE 50

Preparation of ethyl 20-methyl-9-oxo-13-trans-prostenoate

In the manner described in Example 49, 2-(6-carbethoxyhexyl)-2-cyclopentenone (Example 28) is added to the reagent prepared from 1-nonyne, diisobutylaluminum hydride and n-butyl lithium. The crude product obtained by acid hydrolysis and evaporation of organic solvent is purified by chromatography on silica gel to give an oil, IR 1740 cm$^{-1}$ (ester and ketone carbonyls) and 967 cm$^{-1}$ (trans vinyl group).

EXAMPLE 51

Preparation of ethyl 17-methyl-9oxo-19,20-dinor-13-trans-prostenoate

In the manner described in Example 49, 2-(6-carbethoxyhexyl)-2-cyclopentenone (Example 28) is added to the reagent prepared from 5-methyl-1-hexyne, diisobutylaluminum hydride and n-butyl lithium. The crude product obtained by acid hydrolysis and evaporation of the organic solvent is purified by chromatography on silica gel to give an oil, IR 1740 cm$^{-1}$ (ester and ketone carbonyls) and 967 cm$^{-1}$ trans vinyl group).

EXAMPLE 52

Preparation of ethyl 20-chloro-9-oxo-17,18,19-trinor-13-trans-prostenoate

In the manner described in Example 49, 2-(6-carbethoxyhexyl)-2-cyclopentenone (Example 28) is added to the reagent prepared from 5-chloro-1-pentyne, diisobutylaluminum hydride, and n-butyl lithium. The crude product, obtained by acid hydrolysis and evaporation of the organic solvent, is purified by distillation to give an oil, IR 1740 cm$^{-1}$ (ester and ketone carbonyls) and 967 cm$^{-1}$ (trans vinyl group).

EXAMPLE 53

Preparation of ethyl 9-oxo-13-propyl-18,19,20-trinor-13-trans-prostenoate

In the manner described in Example 49, 2-(6-carbethoxyhexyl)-2-cyclopentenone (Example 28) is added to the reagent prepared from 4-octyne, diisobutylaluminum hydride, and n-butyl lithium. The crude product mixture, obtained by acid hydrolysis and evaporation of the organic solvent, is separated chromato on silica gel and distillation to give ethyl 9-oxo-13-propyl-18,19,20-trinor-113-trans-prostenoate as an oil, IR 1740 cm$^{-1}$ (ester and ketone carbonyls); NMR (CCl$_4$) δ 5.2 ppm (multiplet, vinyl proton and a second oil (ethyl 9-oxo-17,18,19,20-tetranorprostanoate), IR 1740 cm$^{-1}$ (ester and ketone carbonyls); NMR (CCl$_4$) δ 1.0 ppm (multiplet, terminal methyl group).

EXAMPLE 54

Preparation of cis-5-octen-1-yne

A 57% sodium hydride dispersion (9.66 g., 0.23 mole) is washed free of mineral oil in a nitrogen atmosphere with hexane. The hydride is heated at 75°C. with 220 ml. of dimethylsulfoxide for 45 minutes. The resulting green solution is cooled to 18°C. and treated with a solution of 4-pentynyl-triphenylphosphonium iodide (100 g., 0.22 mole) in 220 ml. of dimethylsulfoxide over a 25 minute period. The resulting red solution is stirred at ambient temperature for 45 minutes. To the solution is added a solution of freshly distilled propionaldehyde (14.0 g., 0.24 mole) in 10 ml. of dimethylsulfoxide over a 10 minute period at 25°C. After standing at room temperature, the reaction is quenched with half-saturated brine and brought to pH 4 with 4N HCl. The product is extracted with an ether-hexane mixture, and the extract is washed successively with water and brine, dried over MgSO$_4$, and concentrated. The crude product is fractionated with a spinning band column to give a colorless distillate, b.p. 121°–122°C., IR 3270, 2110 and 1645 cm$^{-1}$.

EXAMPLE 55

Preparation of ethyl 9-oxo-13-trans-17-cis-prostadienoate

In the manner described in Example 49, 2-(6-carbethoxyhexyl)-2-cyclopentenone (Example 28) is added to the reagent prepared from cis-5-octen-1-yne (Example 54), diisobutylaluminum hydride, and n-butyl lithium. The crude product, obtained by acid hydrolysis and evaporation of the organic solvent, is purified by distillation to give an oil, IR 740 cm$^{-1}$ (ester and ketone carbonyls) and 967 cm$^{-1}$ (trans-vinyl group).

EXAMPLE 56

Preparation of ethyl 9-oxo-6,7-dinor-13-trans-prostenoate

In the manner described in Example 44, 2-(4-carbethoxybutyl)-2-cyclopentenone (Example 31) is added to the reagent prepared from 1-octyne, diisobutylaluminum hydride, and methyl lithium. The product is obtained by acid hydrolysis, ether extraction and distillation to yield a colorless oil, b.p. 149°–150°C. (0.075 mm.). IR 1740 cm$^{-1}$ (ester and ketone carbonyls) 963 cm$^{-1}$ (trans-vinyl group).

EXAMPLE 57

Preparation of ethyl 20-chloro-9-oxo-6,7-dinor-13-trans prostenoate

In the manner described in Example 49, 2-(4-carbethoxybutyl)-2-cyclopentenone (Example 31) is added to the reagent prepared from 8-chloro-1-octyne, diisobutylaluminum hydride, and n-butyl lithium. The crude product obtaianed by acid hydrolysis and ether extraction is purified by silica gel chromatography to give an oil, IR 1740 cm$^{-1}$ (ester and ketone carbonyls) 967 cm$^{-}$(trans-vinyl group).

EXAMPLE 58

PREPARATION OF ETHYL 9-oxo-6,7,20-trinor-13-trans-prostenoate

In the manner described in Example 44, 2-(6-carbethoxybutyl)-2-cyclopentenone (Example 31) is added to the reagent prepared from 1-heptyne, diisobutylaluminum hydride and methyl lithium. The crude product obtained by acid hydrolysis and ether extraction is purified by sililca gel chromatography to give an oil, IR 1740 cm$^{-1}$ (ester and ketone carbonyls) 967 cm$^{-1}$ (transvinyl group).

EXAMPLE 59

Preparation of ethyl 9-oxo-6,7-dinor-13-trans-17-cis-prostadienoate

In the manner described in Example 55, 2-(4-carbethoxybutyl)-2-cyclopentenone (Example 31) is added to the reagent prepared from cis-5-octen-1-yne (Example 54), diisobutylaluminum hydride, and n-butyl lithium. The crude product obtained by acid hydrolysis and ether extraction is purified by silica gel chromatography to give an oil, IR 1740 cm$^{-1}$ (ester and ketone carbonyls) 967 cm$^{-1}$ (trans-vinyl group).

EXAMPLE 60

Preparation of ethyl 20-chloro-9-oxo-6,7,17,18,19-pentanor-13-trans-prostenoate

In the manner described in Example 49, 2-(4-carbethoxybutyl)-2-cyclopentenone (Example 31) is added to the reagent prepared from 5-chloro-1-pentyne diisobutylaluminum hydride, and n-butyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 61

Preparation of ethyl 17-methyl-9-oxo-6,7,19,20-tetranor-13-trans-prostenoate

In the manner described in Example 49, 2-(4-carbethoxybutyl)-2-cyclopentenone (Example 31) is added to the reagent prepared from 5-methyl-1-hexyne, diisobutylaluminum hydride and n-butyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 62

Preparation of ethyl 9-oxo-13-propyl-6,7,18,19,20-pentanor-13-trans-prostenoate

In the manner described in Example 44, 2-(4-carbethoxybutyl)-2-cyclopentenone (Example 31) is added to the reagent prepared from 4-octyne diisobutylaluminum hydride, and methyl lithium. The crude product obtained by acid hydrolysis and ether extraction is purified by silica gel chromatography to give an oil, IR 1740 cm$^{-1}$ (ester and ketone carbonyls).

EXAMPLE 63

Preparation of ethyl 9-oxo-3,4,5,6,7-pentanor-13-trans-prostenoate

In the manner described in Example 44, 2-(carbethoxymethyl)-2-cyclopentenone (Example 29) is added to the reagent prepared from 1-octyne, diisobutylaluminum hydride and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 64

Preparation of ethyl 9-oxo-3,4,5,6,7-pentanor-13-trans-17-cis-prosotadienoate

In the manner described in Example 55, 2-(carbethoxymethyl)-2-cyclopentenone (Example 29) is added to the reagent prepared from cis-5-octen-1-yne (Example 54), diisobutylaluminum hydride, and n-butyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 65

Preparation of ethyl 20-chloro-9-oxo-3,4,5,6,7,17,18,19-octanor-13-trans-prostenoate In the manner described in Example 49, 2-(carbethoxymethyl)-2-cyclopentenone (Example 29) is added to the reagent prepared from 5-chloro-1-pentyne diisobutylaluminum hydride, and n-butyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 66

Preparation of ethyl 9-oxo-5,6,7-trinor-13-trans-prostenoate

In the manner described in Example 44, 2-(3-carbethoxypropyl)-2-cyclopentenone (Example 30) is added to the reagent prepared from 1-octyne diisobutylaluminum hydride and methyl lithium. The crude product obtained by acid hydrolysis and ether extraction is purified by silica gel chromatograhy to give an oil, IR 1740 cm$^{-1}$ (ester and ketone carbonyls), 967 cm$^{-1}$ (trans-vinyl group).

EXAMPLE 67

Preparation of ethyl 9-oxo-20-propyl-5,6,7-trinor-13-trans-prostenoate

In the manner described in Example 44, 2-(3-carbethoxypropyl)-2-cyclopentenone (Example 30) is added to the reagent prepared from 1-undecyne, diisobutylaluminum hydride and methyl lithium. The crude product obtained by acid hydrolysis and ether extraction is purified by silica gel chromatography to give aan oil, IR 1740 cm$^{-1}$ (ester and ketone carbonyls), 967 cm$^{-1}$ (trans-vinyl group).

EXAMPLE 68

Preparation of ethyl 9-oxo-5,6,7,18,19,20-hexanor-13-trans-prostenoate

In the manner described in Example 44, 2-(3-carbethoxypropyl)-2-cyclopentenone (Example 30) is added to the reagent prepared from 1-pentyne, diisobutylaluminum hydride and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 69

Preparation of ethyl 20-chloro-9-oxo-5,6,7-trinor-13-transprostenoate

In the manner described in Example 44, 2-(3-carbethoxypropyl)-2-cyclopentenone (Example 30) is added to the reagent prepared from 8-chloro-1-octyne, diisobutylaluminum hydride, and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 70

Preparation of ethyl 9-oxo-7a,7b-bis-homo-13-trans-prostenoate

In the manner described in Example 44, 2-(8-carbethoxyoctyl)-2-cyclopentenone (Example 39) is added to the reagent prepared from 1-octyne, diisobutylaluminum hydride, and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 71

Preparation of ethyl 20-chloro-9-oxo-7a,7bis-homo-17,18,19-trinor-13-trans-prostenoate In the manner described in Example 49, 2-(8-carbethoxyoctyl)-2-cyclopentenone (Example 39) is added to the reagent prepared from 5-chloro-1-pentyne, diisobutylaluminum hydride, and n-butyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 72

Preparation of ethyl 20-butyl-9-oxo-7a,7b-bis-homo-13-trans-prostenoate

In the manner described in Example 44, 2-(8-carbethoxyoctyl)-2-cyclopentenone (Example 39) is added to the reagent prepared from 1-dodecyne, diisobutylaluminum hydride, and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 73

Preparation of ethyl 15-methyl-9-oxo-7a,7b-bis-homo-17,18,19,20-tetranor-13-trans-prostenoate In the manner described in Example 44, 2-(8-carbethoxyoctyl)-2-cyclopentenone (Example 39) is added to the reagent prepared from 3-methyl-1-butyne, diisobutylaluminum hydride, and methyl lithium. The crude product obtained by acid hydrolysis and ether extraction is purified by silica gel chromatography to give an oil, IR 1740 cm$^{-1}$ (ester and ketone carbonyls), 967 cm$^{-1}$ (trans-vinyl group).

EXAMPLE 74

Preparation of ethyl 9-oxo-10a-homo-13-trans-prostenoate

In the manner described in Example 49, 2-(6-carbethoxyhexyl)-2-cyclohexenone (Example 40) is added to the reagent prepared from 1-octyne, diisobutylaluminum hydride and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (transvinyl group).

EXAMPLE 75

Preparation of ethyl 20-butyl-9-oxo-10a-homo-13-trans-prostenoate

In the manner described in Example 49, 2-(6-carbethoxyhexyl)-2-cyclohexenone (Example 40) is added to the reagent prepared from 1-dodecyne, diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl) and 967 cm$^{-1}$ (trans-vinyl group).

EXAMPLE 76

Preparation of ethyl 20-chloro-9-oxo-10a-homo-13-trans-prostenoate

In the manner described in Example 49, 2-(6-carbethoxyhexyl)-2-cyclohexenone (Example 40) is added to the reagent prepared from 8-chloro-1-octyne, diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans-vinyl group).

EXAMPLE 77

Preparation of ethyl 20-chloro-9-oxo-17,18,19-trinor-10a-homo-13-trans-prostenoate In the manner described in Example 49, 2-(6-carbethoxyhexyl)-2-cyclohexenone (Example 40) is added to the reagent prepared from 5-chloro-1-pentyne, diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans-vinyl group).

EXAMPLE 78

Preparation of ethyl 9-oxo-18,19,20-trinor-10a-homo-13-trans-prostenoate

In the manner described in Example 49, 2-(6-carbethoxyhexyl)-2-cyclohexanone (Example 40) is added to the reagent prepared from 1-pentyne, diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans-vinyl group).

EXAMPLE 79

Preparation of ethyl 9-oxo-10a-homo-13-trans-17-cis-prostadienoate

In the manner described in Example 49, 2-(6-carbethoxyhexyl)-2-cyclohexenone (Example 40) is added to the reagent prepared from cis-5-octen-1-yne (Example 54), diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans-vinyl group).

EXAMPLES 80–92

The 10a-homo-prostenoate derivatives of Table IV below are obtained in the manner described in Example 49 by addition of the indicated 2-(ω-carbethoxyalkyl)-2-cyclohexenone to the reagent prepared from the appropriate 1-alkyne (listed in the Table), diisobutylaluminum hydride, and n-butyl lithium. The crude products, obtained as oils by acid hydrolysis and evaporation of the organic solvent, are purified by chromatography on silica gel and distillation; IR 1740 cm$^{-1}$ (ester carbonyl), 1750 cm$^{-1}$ (ketone carbonyl), and 967cm$^{-1}$ (trans-vinyl group).

TABLE IV

| Example | Cyclohexenone | 1-Alkyne | Product |
|---|---|---|---|
| 80 | 2-(3-carbethoxypropyl)-2-cyclohexenone (Example 41) | 1-octyne | ethyl 9-oxo-5,6,7-trinor-10a-homo-13-trans-prostenoate |
| 81 | 2-(3-carbethoxypropyl)-2-cyclohexenone (Example 41) | 1-heptyne | ethyl 9-oxo-5,6,7,-20-tetranor-10a-homo-13-trans-prostenoate |
| 82 | 2-(3-carbethoxypropyl)-2-cyclohexenone (Example 41) | 5-chloro-1-pentyne | ethyl 20-chloro-9-oxo-10a-homo-5,6,-7,17,18,19-hexanor-13-trans-prostenoate |
| 83 | 2-(3-carbethoxypropyl)-2-cyclohexenone (Example 41) | 3-methyl-1-butyne | ethyl 15-methyl-9-oxo-5,6,7,17,18,-19,20-heptanor-10a-homo-13-trans-prostenoate |
| 84 | 2-(5-carbethoxypentyl)-2-cyclohexenone (Example 42) | 1-octyne | ethyl 9-oxo-7-nor-10a-homo-13-trans-prostenoate |
| 85 | 2-(5-carbethoxypentyl)-2-cyclohexenone (Example 42) | 1-undecyne | ethyl 9-oxo-20-proply-7-nor-10a-homo-13-trans-prrostenoate |
| 86 | 2-(5-carbethoxypentyl)-2-cyclohexenone (Example 42) | 5-methyl-1-hexyne | ethyl 17-methyl-9-oxo-7,19,20-trinor-10a-homo-13-trans-prostenoate |
| 87 | 2-(5-carbethoxypentyl)-2-cyclohexenone (Example 42) | 8-chloro-1-octyne | ethyl 20-chloro-9-oxo-10a-homo-7-nor-13-trans-prostenoate |
| 88 | 2-(7-carbethoxyheptyl)-2-cyclohexenone (Example 43) | 1-octyne | ethyl 9-oxo-7a,10a-bis-homo-13-trans-prostenoate |
| 89 | 2-(7-carbethoxyheptyl)-2-cyclohexenone (Example 43) | 1-hexyne | ethyl 9-oxo-19,20-dinor-7a,10a-bis-homo-13-trans-prostenoate |
| 90 | 2-(7-carbethoxyheptyl)-2-cyclohexenone (Example 43) | 5-chloro-1-pentyne | ethyl 20-chloro-9-oxo-7a,10a-bis-homo-17,18,19-trinor-13-trans-prostenoate |
| 91 | 2-(7-carbethoxyheptyl)-2-cyclohexenone (Example 43) | 8-chloro-1-octyne | ethyl 20-chloro-9-oxo-7a,10a-bis-homo-13-trans-prostenoate |
| 92 | 2-(7-carbethoxyheptyl)-2-cyclohexenone (Example 43) | 4-octyne | ethyl 13-propyl-9-oxo-18,19,20-trinor-7a,10a-bis-homo-13-trans-prostenoate |

EXAMPLE 93

Preparation of ethyl 9-oxo-5,6,7-trinor-10a-homo-13-trans-17-cis-prostadienoate

In the manner described in Example 49, 2-(3-carbethoxypropyl)-2-cyclohexenone (Example 41) is added to the reagent prepared from cis-5-octen-1-yne (Example 54), diisobutylaluminium hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans vinyl group).

EXAMPLE 94

Preparation of ethyl 9-oxo-7a,10a-bis-homo-13-trans-17-cis-prostadienoate

In the manner described in Example 49, 2-(7-Carbethoxyheptyl)-2-cyclohexenone (Example 43) is added to the reagent prepared from cis-5-octen-1-yne (Example 54), diisobutylaluminum hydride, and n-butyl lithium. The crude product, obtained by acid hydrolysis and evaporation of the organic solvent, is purified by chromatography on silica gel and distillation to give an oil, IR 1740 cm$^{-1}$ (ester carbonyl), 1750 cm$^{-1}$ (ketone carbonyl), and 967 cm$^{-1}$ (trans vinyl group).

EXAMPLE 95

Preparation of ethyl 20-iodo-9-oxo-17,18,19-trinor-13-trans-prostenoate

A stirred mixture of 51.5 g. of ethyl 20-chloro-9-oxo-17,18,19-trinor-13-trans-prostenoate (Example 52), 30 g. of sodium iodide, and 250 ml. of acetone is refluxed for 10 hours. An additional 10 g. of sodium iodide is added, and the reaction is continued for 2 hours. The reaction mixture is filtered, concentrated to a volume of 150 ml., diluted with water, and extracted with ether. The extract is washed with saturated sodium chloride, dried, and evaporated to give an oil.

EXAMPLE 96

Preparation of ethyl 20-iodo-9-oxo-13-trans-prostenoate

A stirred mixture of 30 g. of ethyl 20-chloro-9-oxo-13-trans-prostenoate (Example 48), 25 g. of sodium iodide and 225 ml. of acetone is refluxed for 13 hours. The reaction mixture is concentrated, diluted with water, and extracted with ether. The extract is washed with saturated sodium chloride, dried, and evaporated to give an oil.

EXAMPLES 97–107

Treatment of the corresponding 20-chloroprostenoate or 20-chloro-17,18,19-trinor-prostenoate with sodium iodie in acetone by the procedure of Example 95 provides the 20-iodo derivatives of Table V below.

TABLE V

| Example | Starting 20-Chloro Derivative of Example | Product |
|---|---|---|
| 97 | 57 | ethyl 20-iodo-9-oxo-6,7-dinor-13-trans-prostenoate |
| 98 | 60 | ethyl 20-iodo-9-oxo-6,7,17,18,19-pentanor-13-trans-prostenoate |
| 99 | 65 | ethyl 20-iodo-9-oxo-3,4,5,6,7,17,-18,19-octanor-13-trans-prostenoate |
| 100 | 69 | ethyl 20-iodo-9-oxo-5,6,7-trinor-13-trans-prostenoate |
| 101 | 71 | ethyl 20-iodo-9-oxo-7a,7b-dihomo-17,18,19-trinor-13-trans-prostenoate |
| 102 | 76 | ethyl 20-iodo-9-oxo-10a-homo-13-trans-prostenoate |
| 103 | 77 | ethyl 20-iodo-9-oxo-10a-homo-17,-18,19-trinor-13-trans-prostenoate |
| 104 | 82 | ethyl 20-iodo-9-oxo-10a-homo-5,6,-7,17,18,19-hexanor-13-trans-prostenoate |
| 105 | 87 | ethyl 20-iodo-9-oxo-10a-homo-7-nor-13-trans-prostenoate |
| 106 | 90 | ethyl 20-iodo-9-oxo-7a,10a-dihomo-17,18,19-trinor-13-trans-prostenoate |
| 107 | 91 | ethyl 20-iodo-9-oxo-7a,10a-dihomo-13-trans-prostenoate |

EXAMPLE 108

Preparation of ethyl 9-oxo-18-thia-13-trans-prostenoate

To 6.0 ml. of a stirred, ice-cold solution of 0.5M 5-ethylisothiouronium iodide in 10:1 ethanol:water is added 264 mg. of sodium hydroxide dissolved in 2.0 ml. of ethanol and 4.0 ml. of water. The mixture is stirred under nitrogen at ambient temperature for 15 min. and then cooled in the ice bath while a solution of ethyl 20-iodo-9-oxo-17,18,19-trinor-13-trans-prostenoate (434 mg.) (Example 95) in 3 ml. of ethanol is added. The reaction mixture is stirred successively at 0° for 15 min., at ambient temperature for 15 min., and at 40° for 5 min. The mixture is diluted with water and extracted with ether. The extract is washed successively with water and saturated sodium chloride, dried, and evaporated. The crude product is purified by chromatography on silica gel to give an oil, IR 1740 cm$^{-1}$ (ester and ketone carbonyls) and 967 cm$^{-1}$ (trans vinyl group); NMR (CCl$_4$) δ2.47 ppm (multiplet, methylenethio groups).

EXAMPLES 109–114

Treatment according to the procedure of Example 108, of the various 20-iodo-17,18,19-trinor-trans-prostenoates of Table VI (below) with sodium ethyl mercaptide (prepared in situ as in Example 108) is productive of the various 18-thiaprostenoates of the Table.

TABLE VI

| Example | Starting 20-Iodoprostenoate of Example | Product 18-Thiaprostenoate |
|---|---|---|
| 109 | 98 | ethyl 9-oxo-18-thia-6,7-dinor-13-trans-prostenoate |
| 110 | 99 | ethyl 9-oxo-18-thia-3,4,5,6,7-pentanor-13-trans-prostenoate |
| 111 | 101 | ethyl 9-oxo-18-thia-7a,7b-bis-homo-13-trans-prostenoate |
| 112 | 103 | ethyl 9-oxo-18-thia-10a-homo-13-trans-prostenoate |
| 113 | 104 | ethyl 9-oxo-18-thia-10a-homo-5,6,-7-trinor-13-trans-prostenoate |
| 114 | 106 | ethyl 9-oxo-18-thia-7a,10a-bis-homo-13-trans-prostenoate |

EXAMPLE 115

Preparation of ethyl 9-oxo-18-oxythia-13-trans-prostenoate

To a stirred, ice-cold solution of the 18thiaprostenoate of Example 108 (11.5 g., 31mmole) in a 150 ml. of ethanol is added a solution of sodium metaperiodate (6.65 g., 31.2 mmole) in 55 ml. of water during a twenty min. period. The mixture is allowed to stand at 10°C. for 17 hours. Excess periodate is destroyed by the addition of one ml. of ethylene glycol, and the mixture is filtered. The filtrate is concentrated to one-third of the original volume, diluted with water, and extracted with ether. The extract is washed with brine, dried over MgSO$_4$, and concentrated. Column chromatography of the residue on silica gel with chloroform-ether mixture gives an oil, IR 1740 (ester and ketone carbonyls), 1040 (sulfoxide), and 967 cm$^{-1}$ (trans vinyl group).

EXAMPLE 116

Preparation of ethyl 9-oxo-18-oxythia-5,6,7-trinor-10-a-homo-13-trans-prostenoate This sulfoxide is prepared by treatment of the corresponding sulfide (Example 113) with sodium metaperiodate by the procedure of Example 115.

EXAMPLE 117

Preparation of ethyl-9-oxo-18-oxythia-7a,7b-bis-homo-13-trans-prostenoate

Treatment of the sulfide of Example 111 with sodium metaperiodate by the procedure of Example 115 is productive of the subject sulfoxide.

EXAMPLE 118

Preparation of ethyl 20,20-dicarbethoxy-9-oxo-18,19-dinor-13-trans-prostenoate

To a solution of sodium ethoxide, prepared from 426 mg. of sodium, in 20 ml. of ethanol is added a solution of 3.96 g. of diethyl malonate in 10 ml. of ethanol over a 10 min. period. After stirring for 45 min., a solution containing 5.21 g. of ethyl 20-iodo-9-oxo-17,18,19-trinor-13-trans-prostenoate (Example 95) in 10 ml. of ethanol is added, and the resulting solution is refluxed for 16 hours. The solution is concentrated to one-third of the original volume, diluted with 50 ml. of ether, and treated with 40 ml. of 0.2N HCl. The ether phase is washed with brine, dried over MgSO$_4$, and concentrated. Column chromatography of the residue on silica gel with chloroform-ether mixtures gives an oil, IR 1740 (ester and ketone carbonyls) and 967 cm$^{-1}$ (trans vinyl group); nmr 3.2 δ (triplet, alkyl-malonate methine hydrogen).

EXAMPLES 119-121

Treatment of the appropriate ethyl 20-iodo-17,18,19-trinorprostenoates with diethyl sodio malonate by the procedure of Example 118 is productive of the triester products of Table VII below.

TABLE VII

| Example | Starting Iodoprostenoate of Example | Product |
|---|---|---|
| 119 | 98 | ethyl 20,20-dicarbethoxy-9-oxo-6,7,18,19-tetranor-13-trans-prostenoate |
| 120 | 106 | ethyl 20,20-dicarbethoxy-9-oxo-7a,10a-bis-homo-18,19-dinor-13-trans-prostenoate |
| 121 | 104 | ethyl 20,20-dicarbethoxy-9-oxo-10a-homo-5,6,7,18,19-pentanor-13-trans-prostenoate |

EXAMPLE 122

Preparation of ethyl 9,9-ethylenedioxy-20-iodo-17,18,19-trinor-13-trans-prostenoate A solution of 25.2 g. of ethyl 20-iodo-9-oxo-17,18,19-trinor-13-trans-prostenoate (Example 95), 5.6 ml. of ethylene glycol and 110 mg. of p-toluenesulfonic acid monohydrate in 170 ml. of benzene is refluxed for 4 hours with azeotropic removal of water. The solution is concentrated to a volume of 50 ml. Column chromatography of the solution on Florisil with benzene gives a liquid, IR 1740 (ester carbonyl), 967 (trans vinyl group), and 952 cm$^{-1}$ (ethylene ketal).

EXAMPLES 123-127

Ketalization with ethylene glycol in the presence of p-toluenesulfonic acid of the appropriate 20-iodo-9-oxo-prostenoates by the procedure of Example 122 provides the ketals of Table VIII, which follows.

TABLE VIII

| Example | Starting Ketone of Example | Product |
|---|---|---|
| 123 | 99 | ethyl 9,9-ethylenedioxy-20-iodo-3,4,5,6,7,17,18,19-octanor-13-trans-prostenoate |
| 124 | 98 | ethyl 9,9-ethylenedioxy-20-iodo-6,7,17,18,19-pentanor-13-trans-prostenoate |

TABLE VIII—Continued

| Example | Starting Ketone of Example | Product |
|---|---|---|
| 125 | 104 | ethyl 9,9-ethylenedioxy-20-iodo-10a-homo-5,6,7,17,18,19-hexanor-13-trans-prostenoate |
| 126 | 106 | ethyl 9,9-ethylenedioxy-20-iodo-7a,10a-bis-homo-17,18,19-trinor-13-trans-prostenoate |
| 127 | 96 | ethyl 9,9-ethylenedioxy-20-iodo-13-trans-prostenoate |

EXAMPLE 128

Preparation of ethyl 9,9-ethylenedioxy-18-oxa-13-trans-prostenoate

To a stirred, ice-cold suspension of 1.68 g. of 57% sodium hydride in oil and 20 ml. of dimethylformamide (DMF) is added a solution of 2.5 ml. of ethanol in 5 ml. of DMF over a 15 min. period. The mixture evolves gas and is stirred at room temperature for 45 min. To the resulting suspension is added a solution of 9.57 g. of ethyl 9,9-ethylenedioxy-20-iodo-17,18,19-trinor-13-trans-prostenoate (Example 122) in 15 ml. of DMF over a 10 min. period at 10°–15°C. The resulting dark mixture is stirred at ambient temperature for 45 min. and then poured into 200 ml. of ice water. The mixture is brought to pH 7 with 4N HCl and extracted with ether. The extract is washed with brine, dried over MgSO$_4$, and concentrated. Column chromatography of the residue on silica gel with benzene-ether mixtures gives a liquid, IR 1740 (ester carbonyl), 967 (trans vinyl group), and 952 cm$^{-1}$ (ethylene ketal); nmr 3.4 δ (triplet superimposed on quartet, O-methylene ether groups).

EXAMPLES 129–131

Treatment of the appropriate 20-iodoprostenoate ketals with sodium ethoxide by the procedure of Example 128 is productive of the 18-oxaprostenoate ketals of Table IX, which follows.

TABLE IX

| Example | Starting 20-Iodoprostenoate Ketal of Example | Product |
|---|---|---|
| 129 | 123 | ethyl 9,9-ethylenedioxy-18-oxa-3,4,5,6,7-pentanor-13-trans-prostenoate |
| 130 | 125 | ethyl 9,9-ethylenedioxy-18-oxa-10a-homo-5,6,7-trinor-13-trans-prostenoate |
| 131 | 126 | ethyl 9,9-ethylenedioxy-18-oxa-7a,10a-bis-homo-13-trans-prostenoate |

EXAMPLE 132

Preparation of ethyl 9,9-ethylenedioxy-20-phthalimido-13-trans-prostenoate

A stirred mixture of 8.80 g. of ethyl 9,9-ethylenedioxy-20-iodo-13-trans-prostenoate (Example 127), 3,28 g. of potassium phthalimide, and 25 ml. of DMF is heated at 70°C. for 2 hours. The cooled mixture is diluted with water and extracted with ether. The extract is washed with brine, dried over potassium bicarbonate, and concentrated to give an oil, IR 1770 (phthalimide group), 1735 (ester carbonyl group), 1710 (phthalimide group), 967 (trans vinyl group), and 950 cm$^{-1}$ (ethylene ketal).

EXAMPLE 133

Preparation of 20-amino-9-oxo-13-trans-prostenoic acid hydrochloride

A stirred mixture of 9.3 g. of ethyl 9,9-ethylenedioxy-20-phthalimido-13-trans-prostenoate (Example 132), 2.25 g. of potassium hydroxide, 85 ml. of methanol, and 1.0 ml. of water is refluxed for 2 hours. After addition of 2.25 g. of potassium hydroxide and 2.0 ml. of water, the mixture is refluxed for an additional one hour. The solution is concentrated to remove methanol, and the residue is refluxed with 75 ml. of 4N HCl for 18 hours. The upper phase of the resulting two-phase system is dissolved in water and concentrated to give an oil, IR 1730 (ketone carbonyl group), 1710 (acid carbonyl group), and 967 cm$^{-1}$ (trans vinyl group).

EXAMPLE 134

Preparation of ethyl 9,9-ethylenedioxy-20-pyrrolidino-17,18,19-trinor-13-trans-prostenoate A mixture of 4.17 g. of potassium carbonate, 9.95 g. of pyrrolidine, and 55 ml. of dimethylformamide (DMF) is stirred at 50°C. To the mixture is added a solution of 13.5 g. of ethyl 9,9-ethylenedioxy-20-iodo-17,18,19-trinor-13-trans-prostenoate (Example 122) in 15 ml. of DMF over a 40 min. period. After an additional 30 min. at 50°C. the mixture is cooled and treated with 200 ml. of water. The mixture is extracted with 5:1 (v/v) ether:hexane. The extract is washed with brine, dried with potassium carbonate, and concentrated. Column chromatography of the residue on Florisil with benzene-ether mixtures gives an oil IR 1740 (ester carbonyl group), 967 (trans vinyl group), and 950 cm$^{-1}$ (ethylene ketal).

EXAMPLES 135–138

Treatment of the iodoprostenoate ketals of Table X (below) by the procedure of Example 134 with the indicated amine is productive of the aminoprostenoate ketals of the table.

TABLE X

| Example | Starting Iodoprostenoate of Example | Amine | Aminoprostenoate Product |
| --- | --- | --- | --- |
| 135 | 126 | diethylamine | ethyl 9,9-ethylenedioxy-20-diethylamino-7a,10a-bishomo-17,18,19-trinor-13-trans-prostenoate |
| 136 | 124 | piperidine | ethyl 9,9-ethylenedioxy-20-piperidino-6,7,17,18,19-pentanor-13-trans-prostenoate |
| 137 | 122 | morpholine | ethyl 9,9-ethylenedioxy-20-morpholino-17,18,19-trinor-13-trans-prostenoate |
| 138 | 127 | pyrrolidine | ethyl 9,9-ethylenedioxy-20-pyrrolidino-13-trans-prostenoate |

EXAMPLE 139

Preparation of 20-mercapto-9-oxo-13-trans-prostenoic acid

A solution of 9.53 g. of ethyl 20-iodo-9-oxo-13-trans-prostenoate (Example 96) and 1.60 g. of thiourea in 20 ml. of ethanol is refluxed for 45 min. The resulting solution of the corresponding 20-S-isothiouronium salt is diluted with 140 ml. of methanol and a solution of 5.30 g. of potassium hydroxide in 20 ml. of water. The resulting solution is allowed to stand at room temperature for 19 hours. The solution is concentrated to a volume of 100 ml. and diluted with 200 ml. of water. The solution is acidified with 4N HCl and extracted with ether. The extract is washed with brine, dried over MgSO$_4$, and concentrated. Column chromatography of the residue on silica gel with chloroform-ether mixtures gives an oil, IR 1740 (ketone carbonyl), 1710 (acid carbonyl), and 967 cm$^{-1}$ (trans vinyl group); nmr 2.4 δ (methylene thiol group).

EXAMPLES 140–142

Treatment of the 20-iodoprostenoates of Table XI, below, according to the procedure of Example 139 with thiourea produces the corresponding 20-S-isothiouronium salt, which on treatment with sodium hydroxide solution is productive of the 20-mercaptoprostenoic acids of the table.

TABLE XI

| Example | Starting 20-Iodoprostenoate of Example | Product |
| --- | --- | --- |
| 140 | 97 | 20-mercapto-9-oxo-6,7-dinor-13-trans-prostenoic acid |
| 141 | 102 | 20-mercapto-9-oxo-10a-homo-13-trans-prostenoic acid |
| 142 | 107 | 20-mercapto-9-oxo-7a,10a-bis-homo-13-trans-prostenoic acid |

EXAMPLE 143

Preparation of 9-oxo-20-pyrrolidino-17,18,19-trinor-13-trans-prostenoic acid

A stirred mixture of 9.20 g. of ethyl 9,9-ethylenedioxy-20-pyrrolidino-17,18,19-trinor-13-trans-prostenoate (Example 134), 0.02 ml. of concentrated sulfuric acid, 35 ml. of glacial acetic acid, and 17.5 ml. of water is refluxed for 17 hours. The cooled reaction mixture is treated with 58 mg. of sodium bicarbonate and concentrated to near-dryness. The residue is treated with water and extracted with ether. The ether phase is back-extracted with 0.1N HCl and all aqueous phases are concentrated to give the subject amino acid.

EXAMPLES 144–147

Hydrolysis of the aminoprostenoate ketals of Table XII below by the procedure of Example 143 is productive of the aminoprostenoic acids of the table.

TABLE XII

| Example | Starting Aminoprostenoate Ketal of Example | Product Aminoprostenoic Acid |
| --- | --- | --- |
| 144 | 135 | 20-diethylamino-9-oxo-7a,10a-bis-homo-17,18,19-trinor-13-trans-prostenoic acid |
| 145 | 136 | 9-oxo-20-piperidino-6,7,17,18,-19-pentanor-13-trans-prostenoic acid |
| 146 | 137 | 20-morpholino-9-oxo-17,18,19-trinor-13-trans-prostenoic acid |
| 147 | 138 | 9-oxo-20-pyrrolidino-13-trans-prostenoic acid |

EXAMPLE 148

Preparation of 2-(4-carbethoxybutyl)-2-cyclopentenonemethoxime

Treatment of 2-(4-carbethoxybutyl)-2-cyclopentenone (Example 31) with methoxyamine hydrochloride in the manner described in Example 32 gives an oil, b.p. 107°–109°C. (0.05 mm). IR (film): 1740, 1628, 1050, 885 cm$^{-1}$. $\lambda_{max}$ (MeOH) 243 (13,600).

EXAMPLE 149

Preparation of 2-(5-hydroxypentyl)-2-cyclopentenomethoxime

Treatment of 2-(4-carbethoxybutyl)-2-cyclopentenomethoxime (Example 148) with diisobutyl aluminum hydride in the manner described in Example 33 gives crystals, m.p. 33°–35°C. IR (KBr) 3420, 1630, 1050, 886 cm$^{-1}$. $\lambda_{max}^{MeOH}$ 243 (12,020).

EXAMPLE 150

Preparation of 2-(5-tosylpentyl)-2-cyclopentenomethoxime

Treatment of 2-(5-hydroxypentyl)-2-cyclopentenomethoxime (Example 149) with p-toluenesulfonyl chloride in pyridine in the manner described in Example 34 gives a colorless oil. IR (film) 1600, 1190, 1180, 1050, 885 cm$^{-1}$.

EXAMPLE 151

Preparation of 2-(6,6-dicarbethoxyoctyl)-2-cyclopentenomethoxime

To a solution of sodio diethyl ethylmalonate, prepared from 1.63 g. (0.0387 mole) of sodium hydride in mineral oil (57.2%), 100 ml. of ethylene glycol dimethyl ether and 8.5 g. (0.0452 mole) of ethyl diethyl malonate, is added 7.5 g. of tosylate from Example 150 in 20 ml. of ethylene glycol dimethyl ether and the mixture is refluxed for 3 hours and then allowed to stand at room temperature for 18 hours under nitrogen atmosphere. The reaction mixture is filtered and most of the solvent is removed. The mixture is partitioned between cold dilute hydrochloric acid and diethyl ether, and the organic phase is washed with water and saturated brine, dried (MgSO$_4$), and evaporated to yield an oil. The excess ethyl diethyl malonate is distilled off under reduced pressure to yield 6.7 g. of a yellow oil. IR (film) 1755, 1728, 1627, 1050, 885 cm$^{-1}$.

EXAMPLE 152

Preparation of 2-(6,6-dicarboxyoctyl)-2-cyclopentenomethoxime

Treatment of 2-(6,6-dicarbethoxyoctyl)-2-cyclopentenomethoxime (Example 151) with potassium hydroxide, and 1:1 aqueous methanol in the manner described in Example 36 gives a light yellow oil.

EXAMPLE 153

Preparation of 2-(6-carboxyoctyl)-2-cyclopentenomethoxime

In the manner described in Example 37, treatment of 2-(6,6-dicarboxyoctyl)-2-cyclopentenomethoxime (Example 152) with xylene at reflux for 18 hours gives a yellow oil.

EXAMPLE 154

Preparation of 2-(6-carboxyoctyl)-2-cyclopentenone

Treatment of 2-(6-carboxyoctyl)-2-cyclopentenomethoxime (Example 153) with acetone and 2N hydrochloric acid in the manner described in Example 38 gives a light yellow oil.

EXAMPLE 155

Preparation of 2-(6-carbethoxyoctyl)-2-cyclopentenone

Treatment of 2-(6-carboxyoctyl)-2-cyclopenteone (Example 154) with thionyl chloride and then treatment of the acid chloride with ethanol in the manner described in Example 264 gives an amber oil. The oil is placed on a magnesia-silica gel column and eluted with 3:1 benzene:ether. The solvent is removed and the residue is distilled, b.p. 122°C. (0.06 mm).

EXAMPLES 156–161

Treatment of 2-(6-carbethoxyoctyl)-2-cyclopentenone (Example 155) in the manner of Example 44 with the reagents prepared from the alkyne indicated in Table XIII below, diisobutylaluminum hydride and methyl lithium is productive of the prostenoate esters of the first three Examples of this table. Saponification of the ester by the procedure of Example 177 provides the corresponding prostenoic acids.

TABLE XIII

| Example | Starting Alkyne or Prostenoate ester | Product |
|---|---|---|
| 156 | 1-octyne | ethyl 2-ethyl-9-oxo-13-trans-prostenoate |
| 157 | cis-5-octen-1-yne | ethyl 2-ethyl-9-oxo-13-trans-17-cis-prostadienoate |
| 158 | 8-chloro-1-octyne | ethyl 2-ethyl-9-oxo-20-chloro-13-trans-prostenoate |
| 159 | Example 156 | 2-ethyl-9-oxo-13-trans-prostenoic acid |
| 160 | Example 157 | 2-ethyl-9-oxo-13-trans-17-cis-prostadienoic acid |
| 161 | Example 158 | 2-ethyl-9-oxo-20-chloro-13-trans-prostenoic acid |

EXAMPLE 162

Preparation of ethyl 9$\alpha$- and 9$\beta$-hydroxy-13-trans-prostenoate

A solution of 1 g. of ethyl 9-oxo-13-trans-prostenoate (Example 44) in 40 ml. of absolute alcohol containing 41 mg. of sodium borohydride is stirred at room temperature (protected from moisture) for 19 hours. The mixture is poured into 100 ml. of water and the resulting solution is extracted several times with ether. The combined ether extracts are washed several times with saturated sodium chloride solution, dried with anhydrous magnesium sulfate and taken to dryness to give 806 mg. of an oil. Distillation furnished 700 mg. (70%) of product as a pale yellow oil; b.p. 179°C. (0.13 mm); $\lambda_{max}$ 2.98, 5.78, 5.81 (shoulder), 8.50, 10.30 $\mu$; nmr 2H multiplet $\delta$5.36 (olefinic protons), 2H triplet 4.13 (OCH$_2$ of ester), 3H distorted triplet 1.23 (methyl of ester) and 3H distorted triplet 0.90 (terminal methyl).

EXAMPLES 163–176

The following alcohols (as mixtures of 9$\alpha$- and 9$\beta$-epimers) of Table XIV are prepared by sodium borohydride reduction of the corresponding 9-ketones according to the procedure of Example 162.

TABLE XIV

| Example | Starting Ketone of Example | Product |
|---|---|---|
| 163 | 52 | ethyl 9-hydroxy-20-chloro-17,18,19-trinor-13-trans-prostenoate |
| 164 | 51 | ethyl 9-hydroxy-17-methyl-18,19-dinor-13-trans-prostenoate |
| 165 | 56 | ethyl 9-hydroxy-6,7-dinor-13-trans-prostenoate |

TABLE XIV-Continued

| Example | Starting Ketone of Example | Product |
|---|---|---|
| 166 | 64 | ethyl 9-hydroxy-3,4,5,6,7-pentanor-13-trans-17-cis-prostadienoate |
| 167 | 69 | ethyl 9-hydroxy-20-chloro-5,6,7-trinor-13-trans-prostenoate |
| 168 | 72 | ethyl 9-hydroxy-20-butyl-7a,7b-bis-homo-13-trans-prostenoate |
| 169 | 108 | ethyl 9-hydroxy-18-thia-13-trans-prostenoate |
| 170 | 76 | ethyl 9-hydroxy-20-chloro-10a-homo-13-trans-prostenoate |
| 171 | 89 | ethyl 9-hydroxy-7a,10a-bis-homo-18,19-dinor-13-trans-prostenoate |
| 172 | 113 | ethyl 9-hydroxy-18-thia-10a-homo-5,6,7-trinor-13-trans-prostenoate |
| 173 | 87 | ethyl 9-hydroxy-20-chloro-10a-homo-7-nor-13-trans-prostenoate |
| 174 | 94 | ethyl 9-hydroxy-7a,10a-bis-homo-13-trans-17-cis-prostadienoate |
| 175 | 73 | ethyl 9-hydroxy-15-methyl-7a,7b-bis-homo-17,18,19,20-tetranor-13-trans-prostenoate |
| 176 | 53 | ethyl 9-hydroxy-13-propyl-18,19,20-trinor-13-trans-prostenoate |

EXAMPLE 177

Preparation of 20-butyl-9-oxo-13-trans-prostenoic acid

A solution of 2.33 g. of ethyl 20-butyl-9-oxo-13-trans-prostenoate (Example 45) and 1.30 g. of potassium hydroxide in 35 ml. of methanol and 3.5 ml. of water is allowed to stand at room temperature for 24 hours. The reaction mixture is concentrated in vacuo, diluted with water, and washed with ether. The aqueous phase is acidified to pH 2 and extracted with ether. The extract is washed with saturated sodium chloride, dried, and evaporated to give an oil, IR 1745 cm$^{-1}$ (ketone carbonyl), 1710 cm$^{-1}$ (acid carbonyl), and 967 cm$^{-1}$ (trans vinyl group).

EXAMPLE 178

Preparation of 9-oxo-13-trans-prostenoic acid

A mixture of 0.140 g. of ethyl 9-oxo-13-trans-prostenoate (Example 44) and 0.072 g. of potassium hydroxide in 6 ml. of 1:1 aqueous methanol is stirred at ambient temperature for 17 hours. The resulting solution is acidified with hydrochloric acid, extracted with diethyl ether, and the organic phase is washed with water and saturated brine, dried, and the solvent removed to yield 0.128 g. of an oil, IR 1739 cm$^{-1}$ (ketone carbonyl) 1706 cm$^{-1}$ (acid carbonyl), 969 cm$^{-1}$ (trans vinyl group); NMR (CDCl$_3$) 5.34–5.67 (multiplet, 2H, vinyl protons, J trans = 15 Hz), 10.47 (broad singlet, 1H, carboxyl proton, exchangeable); Mass spectrum, parent peak at 322 mu.

EXAMPLE 179

Preparation of 9-oxo-6,7-dinor-13-trans-prostenoic acid

In the manner described in Example 178, ethyl 9-oxo-6,7-dinor-13-trans-prostenoate (Example 56) is saponified with potassium hydroxide, acidified, and worked-up by ether extraction and evaporative distillation at 60°C. (0.005 Toor) to yield a colorless oil.

EXAMPLE 180

Preparation of 9α- and 9β-hydroxy-13-trans-prostenoic acid

A suspension of 1.8 g. of ethyl 9α- and 9β-hydroxy-13-trans-prostenoate (Example 162) in 40 ml. of aqueous methanol (1:1) containing 890 mg. of potassium hydroxide is stirred at ambient temperature for 18 hours. The resulting solution is cooled, acidified with 1N hydrochloric acid and extracted several times with ether. The combined ether extracts are washed with sodium chloride solution, dried with anhydrous magnesium sulfate, and taken to dryness to give 1.61 g. (98%) of product as an oil; $\lambda_{max}$ 2.95, 3.40, 3.75, 5.85, 10.31 μ; nmr 2H singlet δ6.10 (hydroxyl and carboxyl protons), 2H multiplet 5.40 (olefinic protons), and 3H distorted triplet 0.90 (terminal methyl).

EXAMPLES 181–251

In the manner described in Example 177, the carboxylic acids of Table XV (below) are prepared by saponification of the corresponding ethyl esters at room temperature in methanol-water followed by acidification and extraction with ether. Infrared characterization of the cyclopentanone derivatives gives bands at about 1745 cm$^{-1}$ (ketone carbonyl), 1710 cm$^{-1}$ (acid carbonyl) and 967 cm$^{-1}$ (trans vinyl group). The cyclohexanone derivatives also show the 967 cm$^{-1}$ band, but the carboxylic acid and ketone carbonyl functions give bands occurring at about 1715 cm$^{-1}$.

TABLE XV

| Example | Starting Ester of Example | Product |
|---|---|---|
| 181 | 46 | 9-oxo-18,19,20-trinor-13-trans-prostenoicacid |
| 182 | 47 | 15-methyl-9-oxo-17,18,19,20-tetranor-13-trans-prostenoic acid |
| 183 | 48 | 20-chloro-9-oxo-13-trans-prostenoic acid |
| 184 | 49 | 9-oxo-20-nor-13-trans-prostenoic acid |
| 185 | 50 | 20-methyl-9-oxo-13-trans-prostenoic acid |
| 186 | 51 | 17-methyl-9-oxo-19,20-dinor-13-trans-prostenoic acid |
| 187 | 52 | 20-chloro-9-oxo-17,18,19-trinor-13-trans-prostenoic acid |
| 188 | 53 | 9-oxo-13-propyl-18,19,20-trinor-13-trans-prostenoic acid |
| 189 | 55 | 9-oxo-13-trans-17-cis-prostadienoic acid |
| 190 | 57 | 20-chloro-9-oxo-6,7-dinor-13-trans-prostenoic acid |
| 191 | 58 | 9-oxo-6,7,20-trinor-13-trans-prostenoic acid |
| 192 | 59 | 9-oxo-6,7-dinor-13-trans-17-cis-prostadienoic acid |

TABLE XV-Continued

| Example | Starting Ester of Example | Product |
|---|---|---|
| 193 | 60 | 20-chloro-9-oxo-6,7,17,18,19-pentanor-13-prostenoic acid |
| 194 | 61 | 17-methyl-9-oxo-6,7,19,20-tetranor-13-trans-prostenoic acid |
| 195 | 62 | 9-oxo-13-propyl-6,7,18,19,20-pentanor-13-trans-prostenoic acid |
| 196 | 63 | 9-oxo-3,4,5,6,7-pentanor-13-trans-prostenoic acid |
| 197 | 64 | 9-oxo-3,4,5,6,7-pentanor-13-trans-17-cis-prostadienoic acid |
| 198 | 65 | 20-chloro-9-oxo-3,4,5,6,7,17,18,19-octanor-13-trans-prostenoic acid |
| 199 | 66 | 9-oxo-5,6,7-trinor-13-trans-prostenoic acid |
| 200 | 67 | 9-oxo-20-propyl-5,6,7-trinor-13-trans-prostenoic acid |
| 201 | 68 | 9-oxo-5,6,7,18,19,20-hexanor-13-trans-prostenoic acid |
| 202 | 69 | 20-chloro-9-oxo-5,6,7-trinor-13-trans-prostenoic acid |
| 203 | 70 | 9-oxo-7a,7b-bis-homo-13-trans-prostenoic acid |
| 204 | 71 | 20-chloro-9-oxo-7a,7b-bis-homo-17,18-19-trinor-13-trans-prostenoic acid |
| 205 | 72 | 20-butyl-9-oxo-7a,7b-bis-homo-13-trans-prostenoic acid |
| 206 | 73 | 15-methyl-9-oxo-7a,7b-bis-homo-17,18,-19,20-tetranor-13-trans-prostenoic acid |
| 207 | 74 | 9-oxo-10a-homo-13-trans-prostenoic acid |
| 208 | 75 | 20-butyl-9-oxo-10a-homo-13-trans-prostenoic acid |
| 209 | 76 | 20-chloro-9-oxo-10a-homo-13-trans-prostenoic acid |
| 210 | 77 | 20-chloro-9-oxo-10a-homo-17,18,19-trinor-13-trans-prostenoic acid |
| 211 | 78 | 9-oxo-18,19,20-trinor-10a-homo-13-trans-prostenoic acid |
| 212 | 79 | 9-oxo-10a-homo-13-trans-17-cis-prostadienoic acid |
| 213 | 93 | 9-oxo-5,6,7-trinor-10a-homo-13-trans-17-cis-prostadienoic acid |
| 214 | 94 | 9-oxo-7a,10a-bis-homo-13-trans-17-cis-prostadienoic acid |
| 215 | 80 | 9-oxo-5,6,7-trinor-10a-homo-13-trans-prostenoic acid |
| 216 | 81 | 9-oxo-5,6,7,20-tetranor-10a-homo-13-trans-prostenoic acid |
| 217 | 82 | 20-chloro-9-oxo-5,6,7,17,18,19-hexanor-10a-homo-13-trans-prostenoic acid |
| 218 | 83 | 15-methyl-9-oxo-5,6,7,17,18,19,20-heptanor-10a-homo-13-trans-prostenoic acid |
| 219 | 84 | 9-oxo-7-nor-10a-homo-13-trans-prostenoic acid |
| 220 | 85 | 9-oxo-20-propyl-7-nor-10a-homo-13-trans-prostenoic acid |
| 221 | 86 | 17-methyl-9-oxo-7,19,20-trinor-10a-homo-13-trans-prostenoic acid |
| 222 | 87 | 20-chloro-9-oxo-7-nor-10a-homo-13-trans-prostenoic acid |
| 223 | 88 | 9-oxo-7a, 10a, bis-homo-13-trans-prostenoic acid |
| 224 | 89 | 9-oxo-19,20-dinor-7a,10a-bis-homo-13-trans-prostenoic acid |
| 225 | 90 | 20-chloro-9-oxo-7a,10a-bis-homo-17,18,19-trinor-13-trans-prostenoic acid |
| 226 | 91 | 20-chloro-9-oxo-7a,10a-bis-homo-13-trans-prostenoic acid |
| 227 | 92 | 13-propyl-9-oxo-7a,10a-bis-homo-18,-19,20-trinor-13-trans-prostenoate |
| 228 | 108 | 9-oxo-18-thia-13-trans-prostenoic acid |
| 229 | 109 | 9-oxo-18-thia-6,7-dinor-13-trans-prostenoic acid |
| 230 | 110 | 9-oxo-18-thia-3,4,5,6,7-pentanor-13-trans-prostenoic acid |
| 231 | 111 | 9-oxo-18-thia-7a,7b-bis-homo-13-trans-prostenoic acid |
| 232 | 112 | 9-oxo-18-thia-10a-homo-13-trans-prostenoic acid |
| 233 | 113 | 9-oxo-18-thia-10a-homo-5,6,7-trinor-13-trans-prostenoic acid |
| 234 | 114 | 9-oxo-18-thia-7a,10a-bis-homo-13-trans-prostenoic acid |
| 235 | 115 | 9-oxo-18-oxythia-13-trans-prostenoic acid |
| 236 | 116 | 9-oxo-18-oxythia-5,6,7-trinor-10a-homo-13-trans-prostenoic acid |
| 237 | 117 | 9-oxo-18-oxythia-7a,7b-bis-homo-13-trans-prostenoic acid |
| 238 | 163 | 9-hydroxy-20-chloro-17,18,19-trinor-13-trans-prostenoic acid |
| 239 | 164 | 9-hydroxy-17-methyl-18,19-dinor-13-trans-prostenoic acid |
| 240 | 165 | 9-hydroxy-6,7-dinor-13-trans-prostenoic acid |
| 241 | 166 | 9-hydroxy-3,4,5,6,7-pentanor-13-trans-17-cis-prostadienoic acid |
| 242 | 167 | 9-hydroxy-20-chloro-5,6,7-trinor-13-trans-prostenoic acid |
| 243 | 168 | 9-hydroxy-20-butyl-7a,7b-bis-homo-13-trans-prostenoic acid |
| 244 | 169 | 9-hydroxy-18-thia-13-trans-prostenoic acid |
| 245 | 170 | 9-hydroxy-20-chloro-10a-homo-13-trans-prostenoic acid |
| 246 | 171 | 9-hydroxy-7a,10a-bis-homo-18,19-dinor-13-trans-prostenoic acid |
| 247 | 172 | 9-hydroxy-18-thia-10a-homo-5,6,7-trinor-13-trans-prostenoic acid |
| 248 | 173 | 9-hydroxy-20-chloro-10a-homo-7-nor-13-trans-prostenoic acid |
| 249 | 174 | 9-hydroxy-7a,10a-bis-homo-13-trans-17-cis-prostadienoic acid |
| 250 | 175 | 9-hydroxy-15-methyl-7a,7b-bis-homo-17,18,19,20-tetranor-13-trans-prostenoic acid |
| 251 | 176 | 9-hydroxy-13-propyl-18,19,20-trinor-13-trans-prostenoic acid |

EXAMPLE 252

Preparation of 20-carboxy-9-oxo-18,19-dinor-13-trans-prostenoic acid

A solution of ethyl 20,20-dicarbethoxy-9-oxo-18,19-dinor-13-trans-prostenoate (Example 118), prepared from 10.42 g. of iodo compound (Example 95), is dissolved in 240 ml. of methanol and treated with a solution of 9.50 g. of potassium hydroxide in 24 ml. of water. The solution is allowed to stand at room temperature for 42 hours. Most of the methanol is removed in vacuo, and the residue is dissolved in 200 ml. of water. After acidification with 4N HCl the acidic product is extracted with ether. The extract is washed with brine, dried over MgSO$_4$, and evaporated. The residue is heated at 120°C. for 1.5 hours and subjected to column chromatography on silica gel with chloroform ether mixtures to give an oil, IR 1745 cm$^{-1}$ (ketone carbonyl), 1715 cm$^{-1}$ (acid carbonyl), and 967 cm$^{-1}$ (trans vinyl group).

EXAMPLES 253–255

Hydrolysis and decarboxylation, according to the procedure of Example 252, of the appropriate 20,20-dicarbethoxy-18,19-dinorprostenoates provides the 20-carboxy-18,19-dinorprostenoic acids of Table XVI.

TABLE XVI

| Example | Starting Dicarbethoxy Prostenoate of Example | Product |
|---|---|---|
| 253 | 119 | 20-carboxy-9-oxo-6,7,18,19-tetranor-13-trans-prostenoic acid |
| 254 | 120 | 20-carboxy-9-oxo-18,19-dinor-7a,10a-bis-homo-13-trans-prostenoic acid |
| 255 | 121 | 20-carboxy-9-oxo-4,5,7,18,19-pentanor-10a-homo-13-trans-prostenoic acid |

EXAMPLE 256

Preparation of ethyl 18-oxa-9-oxo-13-trans-prostenoate

A solution of 1.07 g. of ethyl 9,9-ethylenedioxy-18-oxa-13-trans-prostenoate (Example 128) and 27 mg. of p-toluenesulfonic acid monohydrate in 10 ml. of acetone is allowed to stand at room temperature for 17 hours. The bulk of the acetone is evaporated, and the residue is treated with 25 ml. of water and extracted with ether. The extract is washed successively with dilute NaHCO$_3$ and brine and dried over MgSO$_4$. Evaporation of the solvent gives an oil, IR 1740 (ester and ketone carbonyls) and 967 cm$^{-1}$ (trans vinyl group).

EXAMPLES 257–259

Treatment of the appropriate 18-oxaprostenoate ketals with acetone and p-toluenesulfonic acid by the procedure of Example 256 is productive of the ethyl 18-oxa-9-oxo-13-trans-prostenoates of Table XVII, which follows.

TABLE XVII

| Example | Starting 18-Oxa-prostenoate Ketal of Example | Product |
|---|---|---|
| 257 | 129 | ethyl 18-oxa-9-oxo-3,4,5,6,7-pentanor-13-trans-prostenoate |
| 258 | 130 | ethyl 18-oxa-9-oxo-5,6,7-trinor-10a-homo-13-trans-prostenoate |
| 259 | 131 | ethyl 18-oxa-9-oxo-7a,10a-bis-homo-13-trans-prostenoate |

EXAMPLES 260–263

Saponification of the appropriate ethyl 18-oxa-9-oxo-13-trans-prostenoates by the procedure of Example 177 is productive of the 18-oxa-9-oxo-13-trans-prostenoic acids of Table XVIII which follows.

TABLE XVIII

| Example | Starting 18-Oxa-prostenoate of Example | Product |
|---|---|---|
| 260 | 256 | 18-oxa-9-oxo-13-trans-prostenoic acid |
| 261 | 257 | 18-oxa-9-oxo-3,4,5,6,7-pentanor-13-trans-prostenoic acid |
| 262 | 258 | 18-oxa-9-oxo-5,6,7-trinor-10a-homo-13-trans-prostenoic acid |
| 253 | 259 | 18-oxa-9-oxo-7a,10a-bis-homo-13-trans-prostenoic acid |

EXAMPLE 264

Preparation of 3'-pyridyl 9-oxo-13-trans-prostenoate

9-Oxo-13-trans-prostenoic acid (Example 178) is converted to 9-oxo-13-trans-prostenoyl chloride by treatment with thionyl chloride. A benzene solution of 9-oxo-13-trans-prostenoyl chloride (24.8 moles) is slowly added to a slight excess of 3-hydroxypyridine (26 moles) in 100 ml. of benzene containing 5 ml. of triethylamine. The mixture is magnetically stirred and refluxed for 30 min. The reaction mixture is filtered and taken to dryness and the residue is dissolved in ether and washed succesively with saline, dilute sodium bicarbonate solution, dried and taken to dryness. The oil is purified by adsorption chromatography on a magnesia-silica gel column and eluted with benzene to give a dark yellow oil.

EXAMPLES 265–278

In the manner described in Example 264, the various prostenoic acids of the following table are converted with thionyl chloride to the corresponding prostenoyl chlorides and thence with the indicated alcohols to the various prostenoic acid esters of Table XIX, which follows.

Table XIX

| Example | Starting Prostenoic Acid of Example | Alcohol | Product |
|---|---|---|---|
| 265 | 200 | methanol | methyl 9-oxo-20-propyl-5,6,7-trinor-13-trans-prostenoate |
| 266 | 178 | n-butanol | n-butyl 9-oxo-13-trans-prostenoate |
| 267 | 178 | 1-decanol | n-decyl 9-oxo-13-trans-prostenoate |
| 268 | 226 | benzyl alcohol | benzyl 9-oxo-20-chloro-7a,10a-bis-homo-13-trans-prostenoate |
| 269 | 192 | 2,2,2-trichloroethanol | 2,2,2-trichloroethyl 9-oxo-6,7-dinor-13-trans-17-cis-prostadienoate |
| 270 | 178 | 2-dimethylaminoethanol | $\beta$-dimethylaminoethyl 9-oxo-13-trans-prostenoate |
| 271 | 204 | cyclohexanol | cyclohexyl 20-chloro-9-oxo-7a,7b-bis-homo-17,18,19-trinor-13-trans-prostenoate |
| 272 | 261 | 3-diethylaminopropanol-1 | $\gamma$-diethylaminopropyl 18-oxa-9-oxo-3,4,5,6,7-pentanor-13-trans-prostenoate |
| 273 | 221 | 2-morpholinoethanol | $\beta$-morpholinoethyl 17-methyl-9-oxo-7,19,20-trinor-10a-homo-13-trans-prostenoate |
| 274 | 178 | 2-pyrrolidinoethanol | $\beta$-pyrrolidinoethyl 9-oxo-13-trans-prostenoate |
| 275 | 178 | 2-piperidinoethanol | $\beta$-piperidinoethyl 9-oxo-13-trans-prostenoate |
| 276 | 178 | phenol | phenyl 9-oxo-13-trans-prostenoate |
| 277 | 178 | 4-dimethylaminobutanol-1 | 4'-dimethylaminobutyl 9-oxo-13-trans-prostenoate |
| 278 | 178 | 3-diethylaminopropanol-1 | $\gamma$-diethylaminopropyl 9-oxo-13-trans-prostenoate |

EXAMPLE 279

Preparation of 4-chloro-1-tetrahydropyranyloxybutane

To 9.25 g. (0.11 mole) of dihydropyran containing 3 drops of phosphorus oxychloride is added 10 g. (0.092 mole) of 4-chlorobutanol-1 dropwise over a period of 2 hours with stirring. The reaction mixture is then allowed to stir overnight at room temperature. The reaction mixture is concentrated, the residue is placed on a Florisil column and the product is eluted with benzene to give 14.4 g. (81%) of the subject compound as an oil.

EXAMPLE 280

Preparation of diethyl 1,1-dimethyl-5-tetrahydropyranylpentylmalonate

To 486 mg. (0.02 g.-atoms) of magnesium in 5 ml. of toluene containing one molar equivalent of tetrahydrofuran per equivalent of magnesium and one percent iodine (calculated in weight of magnesium) is added dropwise 3.86 g. (0.02 mole) of 4-chloro-1-tetrahydropyranyloxybutane over a period of 1 hour with stirring, under nitrogen at 70°C. The reaction mixture is stirred at 70°C. for 4 hours. This reagent is then added dropwise to 3 g. (0.015 mole) of ethyl isopropylidenemalonate in 40 ml. of tetrahydrofuran containing 392 mg. of tetrakis [iodo(tri-n-butylphosphine)copper (I)] and stirred at room temperature for 2 hours. The reaction mixture is poured into cold dilute hydrochloric acid and extracted with ether. The ether extract is dried over magnesium sulfate and concentrated to give 5.92 g. of subject product as an oil.

EXAMPLE 281

Preparation of diethyl 1,1-dimethyl-5-hydroxypentylmalonate

A solution of 3.5 g. (0.01 mole) of diethyl 1,1-dimethyl-5-tetrahydrofuranyloxypentylmalonate in 70 ml. of ethanol containing 3 ml. of hydrochloric acid is allowed to stir at room temperature for 18 hours. The solution is concentrated, diluted with water and extracted with ether. The ether extract is washed with water, dried over magnesium sulfate and concentrated to give 3.262 g. of a light yellow oil. The oil is purified by distillation, b.p. 116°–117°C. (0.05 mm).

EXAMPLE 282

Preparation of 3,3-dimethyl-7-hydroxyheptanoic acid

A mixture of 32 g. (0.117 mole) of diethyl 1,1-dimethyl-5-hydroxypentylmalonate, 25 g. of potassium hydroxide and 600 ml. of methanol-water (1:1) is heated at reflux for 8 hours and then allowed to stand at room temperature for 18 hours. The methanol is removed, diluted with water and the reaction mixture is acidified with concentrated hydrochloric acid. The mixture is extracted with ether. The extract is washed with water and saline, dried over anhydrous magnesium sulfate and concentrated to give 27 g. of 1,1-dimethyl-5-hydroxypentylmalonic acid. This crude oil is dissolved in 200 ml. of bis-(2-methoxyethyl)ether and is heated at reflux for 4 hours and then allowed to stand at room temperature overnight. The solvent is removed and the reaction mixture is diluted with water and extracted with ether. The organic solution is washed with saline, dried over magnesium sulfate and concentrated to give 18 g. of product as an oil.

EXAMPLE 283

Preparation of ethyl 3,3-dimethyl-7-chloroheptanoate

To a solution of 3.484 g. (0.02 mole) of 3,3-dimethyl-7-hydroxyheptanoic acid in 25 ml. of chloroform containing 3 drops of dimethylformamide is added 5.8 ml. (0.08 mole) of thionyl chloride and the solution is then heated at reflux for 3–4 hours. The solution is concentrated to give the intermediate 3,3-dimethyl-7-chloro-1-heptanoyl chloride. The acid chloride is dissolved in a minimum amount of benzene and added slowly to 20 ml. benzene, 10 ml. of ethanol and 2.65 ml. of collidine. The solution is heated at reflux for one hour and then concentrated. The residue is dissolved in ether, washed with water, dilute sodium bicarbonate solution and saline. The organic solution is dried over magnesium sulfate and concentrated to give 3.57 g. of product as a yellow oil.

EXAMPLE 284

Preparation of ethyl 3,3-dimethyl-7-iodoheptanoate

To a solution of 3.57 g. (0.0162 mole) of ethyl 3,3-dimethyl-7-chloroheptanoate in 100 ml. of methyl ethyl ketone is added 4 g. of sodium iodide and the mixture heated at reflux for 18 hours. The reaction mixture is cooled, filtered and concentrated. The residue is partitioned between ether and water. The aqueous phase is extracted several times with ether. The extract is washed with sodium bisulfite solution, water and saline. The organic solution is dried over magnesium sulfate and concentrated to give 4.182 g. of a yellow oil. The material is purified by distillation, b.p. 86°–87°C. (0.18 Torr).

EXAMPLE 285

Preparation of 2-carbalkoxy(methyl/ethyl)-2-(6-carbethoxy-5,5-dimethylhexyl)cyclopentan-1-one This compound is prepared by treatment of sodio cyclopentanone carboxylate enolate with ethyl 3,3-dimethyl-7-iodoheptanoate by the procedure described in Example 1.

EXAMPLE 286

Preparation of 2-(6-carboxy-5,5-dimethylhexyl)cyclopentan-1-one

This compound is prepared by decarbalkoxylation of 2-carbalkoxy (mixed methyl and ethyl ester)-2-(6-carbethoxy-5,5-dimethylhexyl)cyclopentan-1-one by the procedure described in Example 2.

EXAMPLE 287

Preparation of 2-(6-carbethoxy-5,5-dimethylhexyl)cyclopentan-1-one

Esterification of 2-(6-carboxy-5,5-dimethylhexyl)cyclopentan-1-one with ethanol by the procedure of Example 264 is productive of the subject compound.

EXAMPLE 288

Preparation of 1-acetoxy-2-(6-carbethoxy-5,5-dimethylhexyl)cyclopent-1-ene

This compound is prepared from 2-(6-carbethoxy-5,5-dimethylhexyl)cyclopentan-1-one and acetic anhydride by the process described in Example 20.

EXAMPLE 289

Preparation of 2-(6-carbethoxy-5,5-dimethylhexyl)cyclopent-2-en-1-one

This compound is prepared from 1-acetoxy-2-(6-carbethoxy-5,5-dimethylhexyl)cyclopent-1-ene via bromination and dehydrobromination according to the procedure described in Example 28.

EXAMPLE 290

Preparation of 2(3-carbethoxypropyl)-1-methoxyimino-2-cyclopentene

In this manner described for the preparation of the compound of Example 32, 2-(3-carbethoxypropyl)-1-methoximino-2-cyclopentene is prepared from 2-(3-carbethoxypropyl)-2-cyclopentanone (Example 30) and methoxyamine hydrochloride.

EXAMPLE 291

Preparation of 2-(4-hydroxbutyl)-1-methoximino-2-cyclopentene

In the manner described for the preparation of the compound of Example 33, 2-(4-hydroxybutyl)-1-methoximino-2-cyclopentene is prepared from 2-(3-carbethoxypropyl)-1-methoximino-2-cyclopentene and diisobutylaluminum hydride.

EXAMPLE 292

Preparation of 2-(6-carbethoxy-5-oxahexyl)-1-methoximino-2-cyclopentene

To an ice cold solution of 4.833 g. (0.0266 mole) of 2-(4-hydroxypentane-1-methozimino-2-cyclopentene in 50 ml. of dry tetrahydrofuran under nitrogen is added 16.7 ml. of 1.6 molar n-butyl lithium in hexane, dropwise. The reaction mixture is stirred for 0.5 hour and then 4.85 g. (0.029 mole) of ethyl bromoacetate is added dropwise. The reaction mixture is stirred overnight at room temperature and then refluxed for 1.5 hours. The reaction is cooled and poured into water and extracted several times with ether. The ether extracts are washed with saline, dried over magnesium sulfate, and concentrated. The residue is placed on an alumina column, chloroform being used as a wash solvent. The combined washings are concentrated to dryness to give 4.903 g. of product an a yellow oil.

EXAMPLE 293

Preparation of
2-(6-carboxy-5-oxahexyl)-2-cyclopetenone

In the manner described in Example 38, treatment of 2-(6-carbethoxy-5-oxahexyl)-1-methoximino-2-cyclopentene with acetone and 2N hydrochloric acid at reflux gives the subject compound as a yellow oil.

EXAMPLE 294

Preparation of
2-(6-carbethoxy-5-oxahexyl)-2-cyclopentenone

In the manner described in Example 39, treatment of 2-(6-carboxy-5-oxahexyl)-2-cyclopentenone with p-toluenesulfonic acid in ethanol produces the subject product as a light yellow oil.

EXAMPLE 295

Preparation of
2-(4-p-toluenesulfonyloxybutyl)-1-methoximino-2-cyclopentene

In the manner described in Example 34, treatment of 2-(4-hydroxybutyl)-1-methoximino-2-cyclopentene with p-toluene sulfonyl chloride in pyridine gives the subject product as a light yellow oil; IR (film): 1600, 1190, 1050, 885 cm$^{-1}$.

EXAMPLE 296

Preparation of
2-(6-carbethoxy-5-thiahexyl)-1-methoximino-2-cyclopentene

To a stirred mixture of 1.465 g. (0.0348 mole) of sodium hydride (57.2% in mineral oil) in 50 ml. of dimethoxyethane, under nitrogen, is added slowly 4.8 g. (0.0347 mole) of ethyl-2-mercaptoacetate. The reaction mixture is stirred at room temperature for 1 hour and then a solution of 7.8 g. (0.0231 mole) of 2-(4-p-toluenesulfonyloxybutyl)-1-methoximino-2-cyclopentene in 30 ml. of dimethoxyethane is added dropwise and stirred at room temperature for 18 hours. The solution is heated at reflux for one hour, cooled and poured into cold dilute hydrochloric acid and then extracted with ether. The combined ether extracts are washed with saline, dried over magnesium sulfate and evaporated to give 7.6 g. of subject product as a yellow oil.

EXAMPLE 297

Preparation of
2-(6-carboxy-5-thiahexyl)-2-cyclopentenone

In the manner described in Example 38, treatment of 2-(6-carbethoxy-5-thiahexyl)-1-methoximino-2-cyclopentene with acetone and 2N hydrochloric acid at reflux gives the subject product as a yellow oil.

EXAMPLE 298

Preparation of
2-(6-carbethoxy-5-thiahexyl)-2-cyclopentenone

In the manner described in Example 39, treatment of 2-(6-carboxy-5-thiahexyl)-2-cyclopentenone with p-toluenesulfonic acid in ethanol gives the subject ester as a yellow oil.

EXAMPLE 299

Preparation of ethyl
9-oxo-3,3-dimethyl-13-trans-prostenoate

In the manner described in Example 44, treatment of 2-(6-carbethoxy-5,5-dimethylhexyl)-cyclopent-2-en-1-one with the reagent prepared from 1-octyne, diisobutylaluminum hydride and methyl lithium provides the subject product as a yellow oil.

EXAMPLE 300

Preparation of ethyl 9-oxo-3-thia-13-trans-prostenoate

In the manner described in Example 44, treatment of 2-(6-carbethoxy-5-thiahexyl)-2-cyclopentenone with the reagent prepared from 1-octyne, diisobutylaluminum hydride and methyl lithium gives the subject 3-thiaprostenate as a yellow oil.

EXAMPLE 301

Preparation of ethyl 3-oxa-9-oxo-13-trans-prostenoate

In the same manner as for the preparation of the compound of Example 44, ethyl 3-oxa-9-oxo-13-trans-prostenoate is prepared by the addition of 2-(6-carbethoxy-5-oxahexyl)-2-cyclopentone to the reagent prepared from 1-octyne, diisobutylaluminum hydride and methyl lithium.

EXAMPLE 302-313

In the manner of Example 44, treatment of the gem-dimethyl, oxa, or thia cyclopentenone esters of Examples 289, 294 and 298, respectively, with the alanate complex obtained from the alkynes indicated in Table XX below, diisobutylaluminum hydried and methyl lithium, is productive of the 3,3-dimethyl, 3-oxa, or 3-thia prostenoates of the Table.

TABLE XX

| Example | Starting Cyclopentenone | Starting Alkyne | Product |
|---|---|---|---|
| 302 | 2-(6-carbethoxy-5,5-dimethylhexyl)-cyclopent-2-en-1-one (Example 289) | 8-chloro-1-octyne | ethyl 20-chloro-3,3-dimethyl-9-oxo-13-trans-prostenoate |

TABLE XX—Continued

| Example | Starting Cyclopentenone | Starting Alkyne | Product |
|---|---|---|---|
| 303 | 2-(6-carbethoxy-5,5-dimethylhexyl)-cyclopent-2-en-1-one (Example 289) | 5-chloro-1-pentyne | ethyl 20-chloro-3,3-dimethyl-9-oxo-17,18,19-trinor-13-trans-prostenoate |
| 304 | 2-(6-carbethoxy-5,5-dimethylhexyl)-cyclopent-2-en-1-one (Example 289) | cis-5-octen-1-yne | ethyl 3,3-dimethyl-9-oxo-13-trans-17-cis-prostadienoate |
| 305 | 2-(6-carbethoxy-5,5-dimethylhexyl)-cyclopent-2-en-1-one (Example 289) | 1-nonyne | ethyl 3,3,20-trimethyl-9-oxo-13-trans-prostenoate |
| 306 | 2-(6-carbethoxy-5-oxahexyl)-2-cyclopentenone (Example 294) | 8-chloro-1-octyne | ethyl 20-chloro-3-oxa-9-oxo-13-trans-prostenoate |
| 307 | 2-(6-carbethoxy-5-oxahexyl)-2-cyclopentenone (Example 294) | 5-chloro-1-pentyne | ethyl 20-chloro-3-oxa-9-oxo-17,18,19-trinor-13-trans-prostenoate |
| 308 | 2-(6-carbethoxy-5-oxahexyl)-2-cyclopentenone (Example 294) | cis-5-octen-1-yne | ethyl 3-oxa-9-oxo-13-trans-17-cis-prostadienoate |
| 309 | 2-(6-carbethoxy-5-oxahexyl)-2-cyclopentenone (Example 294) | 1-nonyne | ethyl 20-methyl-3-oxa-9-oxo-13-trans-prostenoate |
| 310 | 2-(6-carbethoxy-5-thiahexyl)-2-cyclopentenone (Example 298) | 8-chloro-1-octyne | ethyl 20-chloro-9-oxo-3-thia-13-trans-prostenoate |
| 311 | 2-(6-carbethoxy-5-thiahexyl)-2-cyclopentenone (Example 298) | 5-chloro-1-pentyne | ethyl 20-chloro-9-oxo-3-thia-17,18,19-trinor-13-trans-prostenoate |
| 312 | 2-(6-carbethoxy-5-thiahexyl)-2-cyclopentenone (Example 298) | cis-5-octen-1-yne | ethyl 9-oxo-3-thia-13-trans-17-cis-prostadienoate |
| 313 | 2-(6-carbethoxy-5-thiahexyl)-2-cyclopentenone (Example 298) | 1-hexyne | ethyl 9-oxo-3-thia-19,20-dinor-13-trans-prostenoate |

EXAMPLE 314

Preparation of 2-(carbethoxymethyl)-3-(1-trans-octenyl)-1,1-dioxolano-cyclopentane A mixture of 10.142 g. (0.0362 mole) of 2-(carbethoxy-methyl)-3-(1-octenyl)cyclopentanone (ethyl 9-oxo-3,4,5,6,7-pentanor-13-trans-prostenoate, Example 63), 3.49 g. (0.0562 mole) of ethylene glycol, 0.344 g. of p-toluenesulfonic acid monohydrate, and 30 ml. of benzene is refluxed for 4.5 hours with azeotropic removal of water. The mixture is cooled, placed onto a column of 130 g. of Florisil $^R$ in benzene and the ketal is eluted off with benzene. The filtrate is evaporated to yield 9.53 g. of a colorless oil.

EXAMPLE 315

Preparation of 2-(formylmethyl)-3-(1-trans octenyl)-1,1-dioxolano-cyclopentane

To a solution of 1.00 g. (0.00308 mole) of 2-(carbethoxymethyl)-3-(1-trans-octenyl)-1,1-dioxolano cyclopentane in 5 ml. of heptane at −78°C. and under nitrogen is added dropwise 2.60 ml. of a solution of 25% diisobutylaluminum hydride in hexane. The resulting solution is stirred at −78°C. for 2.5 hours and then poured into cold dilute hydrochloric acid. The organic phase is washed with saturated brine, dried ($Na_2SO_4$), and evaporated to yield 0.863 g. of a colorless oil. IR 2695, 1723, 1045, 970 cm$^{-1}$.

EXAMPLE 316

Preparation of 2-(6-carboxy-2-cis-hexenyl)-3-(1-trans-octenyl)-1,1-dioxolano cyclopentane A mixture of 0.194 g. (0.007952 mole) of sodium hydride (free of mineral oil) and 5.5 ml. of dimethylsulfoxide is heated to 70°C. until gas evolution ceases under a nitrogen atmosphere. The resulting solution is cooled below room temperature and treated with a solution of 1.400 g. (0.00316 mole) of 4-carboxybutyl-triphenyl phosphonium bromide [E. J. Corey et al., J. Am. Chem. Soc., 91, 5675 (1969)] in 6 ml. of dimethylsulfoxide. To the resulting red solution is added 0.738 g. (0.00263 mole) of 2-(formylmethyl)-3-(1-trans-octenyl)-1,1-dioxolano cyclopentane in 2 ml. of dimethylsulfoxide and the mixture is stirred at room temperature for 2.25 hours. The mixture is poured into ice water, sodium hydroxide solution is added to pH 12, and the neutral materials are extracted with diethyl ether. The basic phase is acidified with dilute hydrochloric acid and is extracted with diethyl ether. The organic phase is washed with water and saturated brine, dried ($Na_2SO_4$), and evaporated to a semicrystalline mass. The latter is triturated with hot hexane, the solids are filtered off, and the filtrate is evaporated to yield an oil. IR: 1705, 1040, 970, 722 $cm^{-1}$.

EXAMPLE 317

Preparation of 9-oxo-5-cis-13-trans-prostadienoic acid

A solution of 0.726 g. of 2-(6-carboxy-2-cis-hexenyl)-3-(1-trans-octenyl)-1,1-dioxolano cyclopentane and 19 mg. of p-toluenesulfonic acid monohydrate in 30 ml. of acetone is stirred at ambient temperatures for 66 hours. The volatile material is removed in vacuo and the residue is passed through a column of silicia gel in chloroform collecting those fractions which contain product. The solvent is evaporated to yield the subject product as an oil. IR: 1740, 1705, 970, 722 $cm^{-1}$.

EXAMPLE 318

Preparation of ethyl 9-oxo-5-cis-13-trans-prostadienoate

By the procedure described in Example 264, 9-oxo-5-cis-13-trans-prostadienoic acid is esterified with ethyl alcohol to the subject ethyl ester.

EXAMPLES 319–330

Treatment of the 9-oxo-13-trans-prostenoate esters of the following Table with sodium borohydride in ethanol by the method described in Example 162 is productive of the 9-hydroxy-(mixture of α and β epimers)-prostenoates of the following Table.

TABLE XXI

| Example | Starting 9-Oxo-prostenoate of Example | Product |
|---|---|---|
| 319 | 299 | ethyl 9-hydroxy-3,3-dimethyl-13-trans-prostenoate |
| 320 | 302 | ethyl 9-hydroxy-20-chloro-3,3-dimethyl-13-trans-prostenoate |
| 321 | 304 | ethyl 9-hydroxy-3,3-dimethyl-13-trans-17-cis-prostadienoate |
| 322 | 305 | ethyl 9-hydroxy-3,3,20-trimethyl-13-trans-prostenoate |
| 323 | 301 | ethyl 9-hydroxy-3-oxa-13-trans-prostenoate |
| 324 | 306 | ethyl 20-chloro-9-hydroxy-3-oxa-13-trans-prostenoate |
| 325 | 308 | ethyl 9-hydroxy-3-oxa-13-trans-17-cis-prostadienoate |
| 326 | 309 | ethyl 9-hydroxy-20-methyl-3-oxa-13-trans-prostenoate |
| 327 | 300 | ethyl 9-hydroxy-3-thia-13-trans-prostenoate |
| 328 | 312 | ethyl 9-hydroxy-3-thia-13-trans-17-cis-prostadienoate |
| 329 | 313 | ethyl 9-hydroxy-3-thia-19,20-dinor-13-trans-prostenoate |
| 330 | 318 | ethyl 9-hydroxy-5-cis-13-trans-prostadienoate |

EXAMPLES 331–357

Saponification of the esters of the following table by the procedure of Example 177 is productive of the carboxylic acids of this table.

TABLE XXII

| Example | Starting Ester of Example | Product |
|---|---|---|
| 331 | 299 | 3,3-dimethyl-9-oxo-13-trans-prostenoic acid |
| 332 | 300 | 9-oxo-3-thia-13-trans-prostenoic acid |
| 333 | 301 | 9-oxo-3-oxa-13-trans-prostenoic acid |
| 334 | 302 | 20-chloro-3,3-dimethyl-9-oxo-13-trans-prostenoic acid |
| 335 | 303 | 20-chloro-3,3-dimethyl-9-oxo-17,18,19-trinor-13-trans-prostenoic acid |
| 336 | 304 | 3,3-dimethyl-9-oxo-13-trans-17-cis-prostadienoic acid |
| 337 | 305 | 3,3,20-trimethyl-9-oxo-13-trans-prostenoic acid |
| 338 | 306 | 20-chloro-3-oxa-9-oxo-13-trans-prostenoic acid |
| 339 | 307 | 20-chloro-3-oxa-9-oxo-17,18,19-trinor-13-trans-prostenoic acid |
| 340 | 308 | 3-oxa-9-oxo-13-trans-17-cis-prostadienoic acid |
| 341 | 309 | 20-methyl-3-oxa-9-oxo-13-trans-prostenoic acid |
| 342 | 310 | 20-chloro-9-oxo-3-thia-13-trans-prostenoic acid |
| 343 | 311 | 20-chloro-9-oxo-3-thia-17,18,19-trinor-13-trans-prostenoic acid |
| 344 | 312 | 9-oxo-3-thia-13-trans-17-cis-prostadienoic acid |
| 345 | 313 | 9-oxo-3-thia-19,20-dinor-13-trans-prostenoic acid |
| 346 | 319 | 9-hydroxy-3,3-dimethyl-13-trans-prostenoic acid |
| 347 | 320 | 9-hydroxy-20-chloro-3,3-dimethyl-13-trans-prostenoic acid |
| 348 | 321 | 9-hydroxy-3,3-dimethyl-13-trans-17-cis-prostadienoic acid |

TABLE XXII—Continued

| Example | Starting Ester of Example | Product |
|---|---|---|
| 349 | 322 | 9-hydroxy-3,3,20-trimethyl-13-trans-prostenoic acid |
| 350 | 323 | 9-hydroxy-3-oxa-13-trans-prostenoic acid |
| 351 | 324 | 20-chloro-9-hydroxy-3-oxa-13-trans-prostenoic acid |
| 352 | 325 | 9-hydroxy-3-oxa-13-trans-17-cis prostadienoic acid |
| 353 | 326 | 9-hydroxy-20-methyl-3-oxa-13-trans-prostenoic acid |
| 354 | 327 | 9-hydroxy-3-thia-13-trans-prostenoic acid |
| 355 | 328 | 9-hydroxy-3-thia-13-trans-17-cis-prostadienoic acid |
| 356 | 329 | 9-hydroxy-3-thia-19,20-dinor-13-trans-prostenoic acid |
| 357 | 330 | 9-hydroxy-5-cis-13-trans-prostadienoic acid |

We claim:

1. The process of preparing compounds of formula:

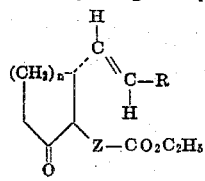

wherein $n$ is the integer 1 or 2; R is selected from the group consisting of a straight chain alkyl group having from three to 10 carbon atoms, a straight chain alkyl group having from two to six carbon atoms and having one branched methyl group, a straight chain alkenyl group having from four to six carbon atoms, and a straight chain ω-chloroalkyl group having from three to six carbon atoms; and Z is a divalent radical selected from the group consisting of those of the formulae:
—$(CH_2)_m$—, —$(CH_2)_q$—O—$CH_2$—, —$(CH_2)_q$—S—$CH_2$—,

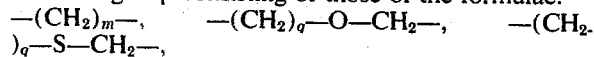

wherein $m$ is an integer from 1 to 8, inclusive, $q$ is an integer from 3 to 6, inclusive, and R is an alkyl group having from one to three carbon atoms; which comprises contacting a compound of the formula:

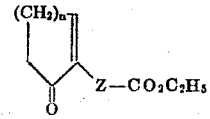

wherein $n$ and $z$ are as hereinabove defined, with up to 1.5 molar equivalents of a reagent of the formula:

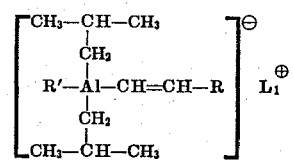

wherein R' is a lower alkyl group and R is as hereinabove defined, in an inert solvent at from about 5°C. to about 40°C. for a period of time sufficient for a substantial degree of conjugate 1,4-addition to take place, hydrolyzing the so formed intermediate alanate-enolate adduct with excess dilute aqueous mineral acid, and recovering the so formed product from the reaction mixture.

2. The process according to claim 1 wherein $n$ is 1, R is —$(CH_2)_5CH_3$, Z is —$(CH_2)_6$—, and R' is methyl.

3. The process according to claim 1 wherein $n$ is 1, R is

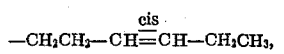

Z is —$(CH_2)_6$—, and R' is methyl.

4. The process according to claim 1 wherein $n$ is 1, R is —$CH_2CH_2CH(CH_3)_2$, Z is —$(CH_2)_6$—, and R' is methyl.

5. The process according to claim 1 wherein $n$ is 1, R is $CH_2CH_2CH_2Cl$, Z is —$(CH_2)_6$—, and R' is methyl.

6. The process according to claim 1 wherein $n$ is 1, R is $(CH_2)_6$—Cl, Z is —$(CH_2)_6$—, and R' is methyl.

7. The process according to claim 1 wherein $n$ is 1, R is —$(CH_2)_5CH_3$, Z is —$(CH_2)_4$—$C(CH_3)_2$—$CH_2$—, and R' is methyl.

8. The process according to claim 1 wherein $n$ is 2, R is —$(CH_2)_5CH_3$, Z is —$(CH_2)_6$—, and R' is methyl.

9. The process according to claim 1 wherein $n$ is 1, R is —$(CH_2)_5CH_3$, Z is —$(CH_2)_4$—O—$CH_2$—, and R' is methyl.

10. The process according to claim 1 wherein $n$ is 1, R is —$(CH_2)_5CH_2$, Z is —$(CH_2)_4$—S—$CH_2$—, and R' is methyl.

* * * * *